United States Patent
Fracchia et al.

(10) Patent No.: US 8,533,115 B2
(45) Date of Patent: *Sep. 10, 2013

(54) PAYMENT SERVICES FOR MULTI-NATIONAL CORPORATIONS

(75) Inventors: Dominique P. Fracchia, San Francisco, CA (US); Stanton R. Koppel, Piedmont, CA (US); Thomas A. Layman, Hillsborough, CA (US)

(73) Assignee: Visa International Service Association, San Francisco, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 12/833,110

(22) Filed: Jul. 9, 2010

(65) Prior Publication Data

US 2010/0312697 A1 Dec. 9, 2010

Related U.S. Application Data

(62) Division of application No. 10/138,182, filed on May 1, 2002, now Pat. No. 7,783,568.

(60) Provisional application No. 60/288,198, filed on May 1, 2001.

(51) Int. Cl.
*G06Q 40/00* (2012.01)

(52) U.S. Cl.
USPC .................................. 705/41; 705/39; 705/40

(58) Field of Classification Search
USPC ....... 705/51, 40, 35, 41, 14, 39, 42; 235/375, 235/380, 492, 379, 381; 902/14
See application file for complete search history.

(56) References Cited

U.S. PATENT DOCUMENTS

| | | | |
|---|---|---|---|
| 5,193,056 A | 3/1993 | Boes | |
| 5,748,908 A * | 5/1998 | Yu | 705/44 |
| 5,890,140 A | 3/1999 | Clark et al. | |
| 5,913,202 A | 6/1999 | Motoyama | |
| 6,385,652 B1 | 5/2002 | Brown et al. | |
| 6,868,441 B2 | 3/2005 | Greene et al. | |
| 6,871,232 B2 | 3/2005 | Curie et al. | |
| 6,931,379 B1 * | 8/2005 | Sato et al. | 705/50 |

(Continued)

OTHER PUBLICATIONS

Notice of Allowance dated May 4, 2010 in U.S. Appl. No. 10/138,182.

(Continued)

*Primary Examiner* — Behrang Badii
(74) *Attorney, Agent, or Firm* — Kilpatrick Townsend & Stockton LLP

(57) ABSTRACT

A central coordinating body (CCB) is part of a global commercial card processing system. The CCB provides standards, relationships, management protocols, problem resolution, processing, data sourcing and reporting capabilities. The local card issuer services a client locally on behalf of the lead card issuer. The lead issuer and CCB enter into an agreement that defines services that will be performed for the client by local issuers and services to be performed by CCB. The local issuers and CCB enter into an agreement defining the services to be provided for the client. A list of services to be provided is published that describes the services provided by a local issuer. The agreements specify a bid process for when an RFP is received from a client. Revenue from transactions received by a local issuer is sent to the lead issuer. The local issuer and CCB charge fees for the services provided to the lead issuer.

13 Claims, 39 Drawing Sheets

Global Commercial Card Processing System Overview

(56) References Cited

U.S. PATENT DOCUMENTS

| | | |
|---|---|---|
| 7,076,465 B1 * | 7/2006 | Blagg et al. ............... 705/40 |
| 2001/0034622 A1 | 10/2001 | Davis |
| 2002/0002579 A1 | 1/2002 | Holden et al. |
| 2002/0010604 A1 | 1/2002 | Block |
| 2002/0026418 A1 * | 2/2002 | Koppel et al. ............... 705/41 |
| 2002/0040936 A1 * | 4/2002 | Wentker et al. ............. 235/492 |
| 2002/0087454 A1 | 7/2002 | Calo et al. |
| 2002/0165775 A1 | 11/2002 | Tagseth et al. |
| 2004/0030657 A1 * | 2/2004 | Holm-Blagg et al. ......... 705/65 |
| 2004/0238620 A1 | 12/2004 | Cohagan et al. |
| 2006/0144926 A1 | 7/2006 | Takada et al. |
| 2006/0144928 A1 * | 7/2006 | Takada et al. ............... 235/380 |
| 2006/0212320 A1 | 9/2006 | Sauser et al. |
| 2009/0134217 A1 * | 5/2009 | Flitcroft et al. .............. 235/380 |

OTHER PUBLICATIONS

Office Action dated Dec. 10, 2008 in U.S. Appl. No. 10/138,182.
Office Action dated Jan. 24, 2008 in U.S. Appl. No. 10/138,182.
Office Action dated Jun. 6, 2007 in U.S. Appl. No. 10/138,182.

* cited by examiner

Global Commercial Card Processing System Overview

Services Menu Processes

Client Implementation Services Processes

Revenue Management Processes

Card Operations Settlement Processes

Customer Service Processes

Data Exchange Services Processes

Media Exchange Processes

Quality Assurance Processes

CCB Administration Processes

| | | Minimum Level of Service for T & E | |
|---|---|---|---|
| 180 | 182 | 184 | 186 |
| Supported Processes | Key Service Levels | Features | Options |
| Product Development | N/A | Client Qualifications | none |
| | | Product Types | Non-revolving charge card |
| | | Liability | Corporate liability |
| | | Features and Benefits | • Cash advances available from ATM with PIN<br>• Limited corporate liability insurance<br>• Emergency cash service<br>• Medical referral, assistance and emergency services<br>• Legal referral, assistance and emergency services<br>• Emergency message service<br>• 24 hour toll-free telephone number to obtain emergency services |
| Client Setup & Enrollments: Client Setup & Maintenance | Within 30 days | Client Reporting Hierarchy Setup & Maintenance | Link to one of several company master accounts |
| | | Client Billing Hierarchy Setup & Maintenance | By subsidiary |
| Client Setup & Enrollments: Cardholder Enrollment, Plastic Issuance and Activation | Association worldwide commercial card issuance standards | Application Acceptance | Paper, on-line, E-mail |
| | | Credit History and Scoring | Yes |
| | | MCC Assignments | |
| | | Purchase Limits | Purchase limit and cash withdrawal limit |
| | | PIN Assignment & Notification | Yes |
| | | Encoding: Embossing & Mailing | Yes |
| | | PIN Creation and Mailing | Yes (not selectable by cardholder) |
| | | Card activation | Yes |
| | | Cardholder Training | Yes |
| Client Setup & Enrollments: Plastic Management | N/A | Card Design | Bank and association logo |
| | | Inventory control processes | Certified by card association |
| | | Card re-issuance policy | According to association standards |
| | | Card Renewal | Automatically every 2 years |
| | | Lost/Stolen Card Replacement | Emergency card replacement service |
| Supplier Enrollments | N/A | | No |
| Transaction Processing: Authorizations & Posting | N/A | Negative File/ Blocked Cards | Yes |
| | | Spending Limits | |
| | | Spending Limit Increases | Confidential Procedures for Client Authorization |

FIG. 12A

| Minimum Level of Service for T&E ||||
|---|---|---|---|
| Supported Processes | Key Service Levels | Features | Options |
| Transaction Processing: Authorizations & Posting | | Authorization Referrals | International Automated Referral Service (IARS) |
| | | Foreign Currency | Transactions in foreign currency converted to local currency |
| | | Multi-currency Card | No |
| | | Authorization Services | • Verification services:<br>  • Account<br>  • Address (AVS and IAVS for international)<br>  • Card Verification Value (CVV and CVV2)<br>  • Positive Cardholder Authorization (PCAS)<br>  • PIN (PVS)<br>  • Telecode Verification<br>• Online advice retrieval<br>  • BASE 1<br>  • SMS<br>• Automatic Cardholder Database Update (Auto-CDB) Service<br>• Dynamic Key Exchange (DKE) Service<br>• Positive Authorization Capacity Management (PACM) Service<br>• Merchant Central File Service (MCFS)<br>• VisaPhone Service |
| | | Authorization Routing Services | • Enhanced and alternate routing services:<br>  • Stand-in Processing (STIP)<br>  • Split<br>  • Visa Shortest Online Path (VSOP)<br>  • Priority<br>• Check Acceptance Service<br>• Gateway Services |
| Transaction Processing: Billing, Remittance, Collection & Statement Processing | N/A | Statementing Type | • Central statementing<br>• Statementing by subsidiary<br>• Local currency |
| | | Statementing Frequency | Choice of statementing cycle |
| | | Statementing Media | Electronic or paper |
| | | Remittance Processing | Yes |
| | | Payment Types | • Direct debit<br>• Electronic payment<br>• Mail |
| | | Payment Options | Selectable collection date |

*FIG. 12B*

| Minimum Level of Service for T&E |||| 
|---|---|---|---|
| Supported Processes | Key Service Levels | Features | Options |
| | | Perform Open Item Accounting | No |
| | | Receivables Aging | Tracked for 30, 60 and 90 days past due |
| | | Internal Collections | Card blocked after 60 days past due |
| | | External Agency Collection | No |
| | | Automated Debits for Payments to Other Entities | No |
| | | Provide Statement Messaging | No |
| | | Maintain Statement History | No |
| Transaction Processing: Rewards Accounting | N/A | Bonus Point Calculations | No |
| Transaction Processing: Client Data Aggregation | Within current cycle period | Link Statements to Reporting and Billing Hierarchies | No |
| | | Non-Financial Data Matching | No |
| | | Level II Data Capture | No |
| | | Data Feeds to Cardholders for Expense Management | No |
| | | Generate Departmental Expense Reports | Through InfoSpan |
| | | Generate Corporate Client G/L Feeds | No |
| Cardholder Servicing | Association service level standards | Cardholder Servicing: Call Center | • Bank call center<br>• Visa call center |
| | | Cardholder Servicing: Correspondence | Yes |
| | | Cardholder Servicing: Email | No |
| | | Cardholder Servicing: Language | Local, English, Japanese |
| | | Cardholder Servicing: Selfservice | No |
| | | Charge Dispute Handling | Yes |
| Risk Management & Fraud Prevention | N/A | Overdue Account/ Collections Tracking & Analysis | Yes |
| | | Risk Management: Develop Risk Models | Yes |
| | | Risk Management: Behavioral and Spending Pattern Analysis | Yes |
| | | Risk Management: Fraudulent Charge Detection | • Risk management services:<br>• Card Recovery Bulletin (CRB)<br>• Cardholder Risk Identification (CRIS)<br>• Fraud Reporting System (FRS)<br>• Status Check Service |
| | | Negative and Exception File Updates | Yes |

FIG. 12C

| Minimum Level of Service for T&E |||| 
|---|---|---|---|
| Supported Processes | Key Service Levels | Features | Options |
| Client MIS Reporting | 30 days after charge | Standard MIS report templates and data feeds | • Authorization and exception reporting based on transaction amount limit and/or MCC blocking<br>• InfoSpan reporting and/or data feeds |
| | | Customized report formats and data feeds | Via InfoSpan |
| | | Automatic report and data generation at customer specified frequency | Via InfoSpan |

*FIG. 12D*

| 180 | 182 | 184 | 186 |
|---|---|---|---|
| Minimum Level of Service for Purchasing Card ||||
| Supported Processes | Key Service Levels | Features | Options |
| Product Development | | Client Qualifications | none |
| | | Product Types | Non-revolving charge purchase card |
| | | Liability | Corporate |
| | | Features and Benefits | • Convenience checks<br>• Visa Liability Waiver Insurance<br>• VAT Reclaim Service |
| Client Setup & Enrollments: Client Setup & Maintenance | | Client Reporting Hierarchy Setup & Maintenance | Same as billing hierarchy |
| | | Client Billing Hierarchy Setup & Maintenance | Control and diversion accounts:<br>• Control/diversion account consolidates charges by MCC codes (e.g. airlines) for groups of cardholders |
| Client Setup & Enrollments: Cardholder Enrollment, Plastic Issuance and Activation | | Application Acceptance | Paper, on-line, E-mail |
| | | Credit History and Scoring | Standard for national industry |
| | | Variable Product Attribute Assignment | Flexible bill and flexible grace |
| | | MCC Assignments | Yes |
| | | Purchase Limits | • Company has aggregate charge limit<br>• Cardholders can be assigned individual limits on charges or cash advances |
| | | PIN Assignment & Notification | According to standards of association |
| | | Encoding: Embossing & Mailing | Cards delivered to program administrator |
| | | PIN Creation and Mailing | According to standards of association |
| | | Card activation | According to standards of association |
| | | Cardholder Training | No |
| Client Setup & Enrollments: Plastic Management | | Card Design | Can include name of company or department name/number |
| | | Inventory control processes | According to national standards |
| | | Card re-issuance policy | According to standards of association |
| | | Card Renewal | According to standards of association |
| | | Lost/Stolen Card Replacement | Protection if bank notified within 24 hours of discovery of lost or stolen card |
| | | Supplier Profile and Chain Setup & Maintenance | Yes |
| Supplier Enrollments | | Supplier Discount Program Maintenance | No |
| | | Non-financial Data Provisioning Setup | Yes |
| | | Purchase Card Program Setup | Yes |
| | | Client Supplier Enrollments | Yes |

*FIG. 13A*

| Minimum Level of Service for Purchasing Card |||| 
|---|---|---|---|
| Supported Processes | Key Service Levels | Features | Options |
| Transaction Processing: Authorization & Posting | | Client Supplier Pricing Maintenance | Yes |
| | | Supplier Profile and Chain Setup & Maintenance | Yes |
| | | Negative File/ Blocked Cards | Yes |
| | | MCC Blocking | Yes |
| | | Transaction Approvals | No |
| | | Authorization Referrals | International Automated Referral Service (IARS) |
| | | Foreign Currency | Transactions in foreign currency converted to local currency |
| | | Multi-currency Card | |
| | | Authorization Services | |
| | | Authorization Routing Services | |
| | | Authorization Services | • Verification services:<br>  • Account<br>  • Address (AVS and IAVS for international)<br>  • Card Verification Value (CVV and CVV2)<br>  • Positive Cardholder Authorization (PCAS)<br>  • PIN (PVS)<br>  • Telecode Verification<br>• Online advice retrieval<br>  • BASE 1<br>  • SMS<br>• Automatic Cardholder Database Update (Auto-CDB) Service<br>• Dynamic Key Exchange (DKE) Service<br>• Positive Authorization Capacity Management (PACM)Service<br>• Merchant Central File Service (MCFS)<br>• VisaPhone Service |
| | | Authorization Routing Services | • Enhanced and alternate routing services:<br>  • Stand-In processing (STIP)<br>  • Split<br>  • Visa Shortest Online Path (VSOP)<br>  • Priority<br>• Check Acceptance Service<br>• Gateway Services |

*FIG. 13B*

| Minimum Level of Service for Purchasing Card | | | |
|---|---|---|---|
| Supported Processes | Key Service Levels | Features | Options |
| Transaction Processing: Billing, Remittance, Collections & Statement Processing | | Statementing Type | Central |
| | | Statementing Frequency | Central bill cycle cuts are weekly, bi-weekly or monthly. Individual cycle cuts are monthly |
| | | Statementing Media | Paper or electronic |
| | | Payment Types | • Automated debit<br>• Wire Transfer<br>• Mail |
| | | Payment Options | • Central or individual<br>• Selectable collection date |
| | | Perform Open Item Accounting | No |
| | | Receivables Aging | Yes |
| | | Internal Collections | Yes |
| | | External Agency Collection | No |
| | | Provide Statement Messaging | No |
| | | Maintain Statement History | No |
| Transaction Processing: Rewards Accounting | | Bonus Point Calculations | No |
| Transaction Processing: Client Data Aggregation | | Link Statements to Reporting and Billing Hierarchies | Yes |
| | | Non-Financial Data Matching | No airline reconciliation |
| | | Level II Data Capture | Yes |
| | | Data Feeds to Cardholders for Expense Management | Yes |
| | | Generate Departmental Expense Reports | Yes, through InfoSpan |
| | | Generate Corporate Client G/L Feeds | Yes |
| Cardholder Servicing | 24 X 7 | Cardholder Servicing: Call Center | Yes |
| | | Cardholder Servicing: Correspondence | Yes |
| | | Cardholder Servicing: Email | No |
| | | Cardholder Servicing: Language | Local language |
| | | Cardholder Servicing: Self service | No |
| | | Charge Dispute Handling | Up to 60 days after item appears on a statement |
| Risk Management & Fraud Prevention | | Overdue Account/ Collections Tracking & Analysis | Yes |
| | | Risk Management: Develop Risk Models | Yes |

*FIG. 13C*

| Minimum Level of Service for Purchasing Card |||| 
|---|---|---|---|
| Supported Processes | Key Service Levels | Features | Options |
| | | Risk Management: Behavioral and Spending Pattern Analysis | Yes |
| | | Risk Management: Fraudulent Charge Detection | • Risk management services:<br>• Card Recovery Bulletin (CRB)<br>• Cardholder Risk Identification (CRIS)<br>• Fraud Reporting System (FRS)<br>• Status Check Service |
| | | Negative and Exception File Updates | Yes |
| Client MIS Reporting | | Standard MIS report templates and data feeds | InfoSpan |
| | | Customized report formats and data feeds | InfoSpan ad hoc reporting |
| | | Automatic report and data generation at customer specified frequency | Through InfoSpan |

*FIG. 13D*

Architectural Overview

Lead Bank and participating Bank Components

CCB Components

| | | | | |
|---|---|---|---|---|
| Internal CCB Application Interfaces | | | | |
| Contract Management<br>-Service Menu<br>-Client Implementation Services | Financial Accounting<br>-Revenue Management<br>-Card Operations Settlement<br>-CCB Admin. | MIS & Operations<br>-Client Implementation Services<br>-CCB Admin. | | |
| Product Management<br>-Service Menu<br>-Customer Service | Distribution & Inventory<br>-Media Exchange | Quality Management<br>-Quality Management | | |
| Quality Management<br>-Quality Assurance<br>-Service Menu | Human Resources<br>-CCB Admin. | Business Intelligence<br>-CCB Admin. | Customer Service<br>-Customer Service<br>-Service Menu | |
| Web Services | Data Exchange Services | | Messaging Services | |
| Metadata Repository | Security | | CCB Data Store | |
| CCB Network | | | | |

Overview of CCB Applications

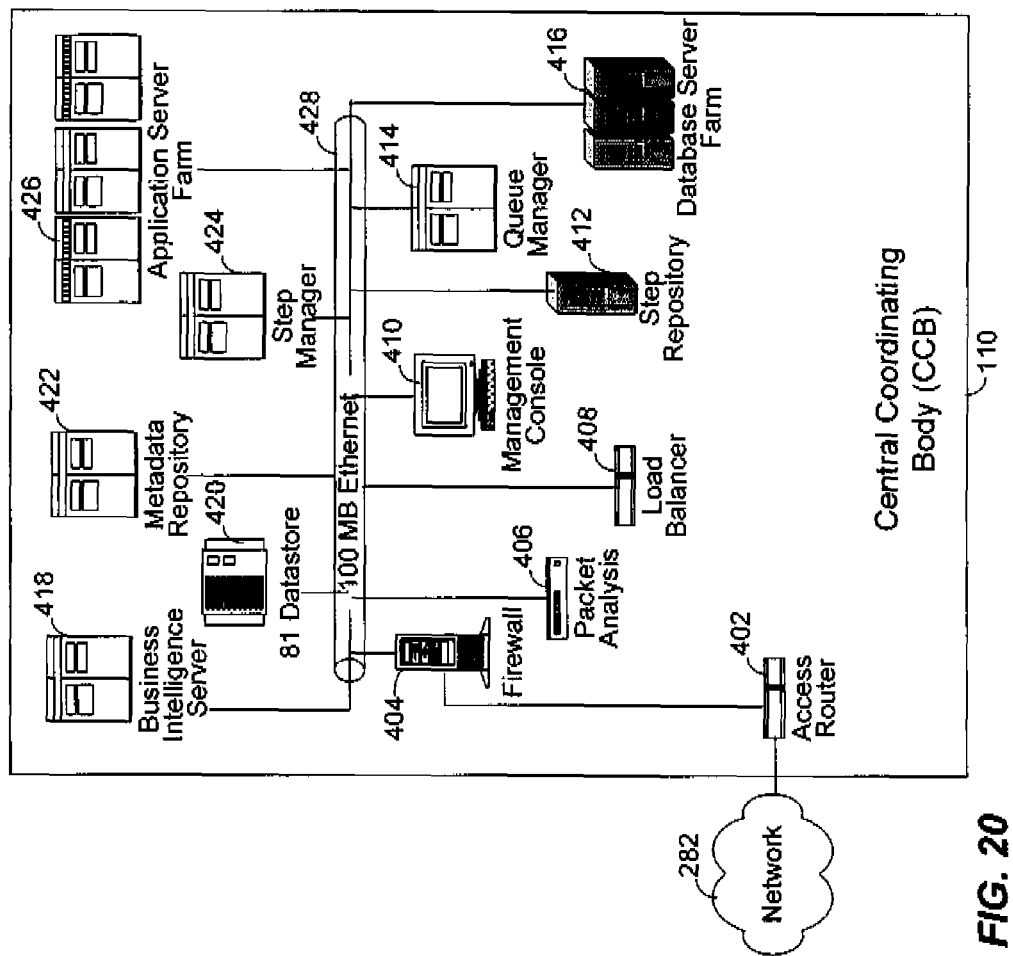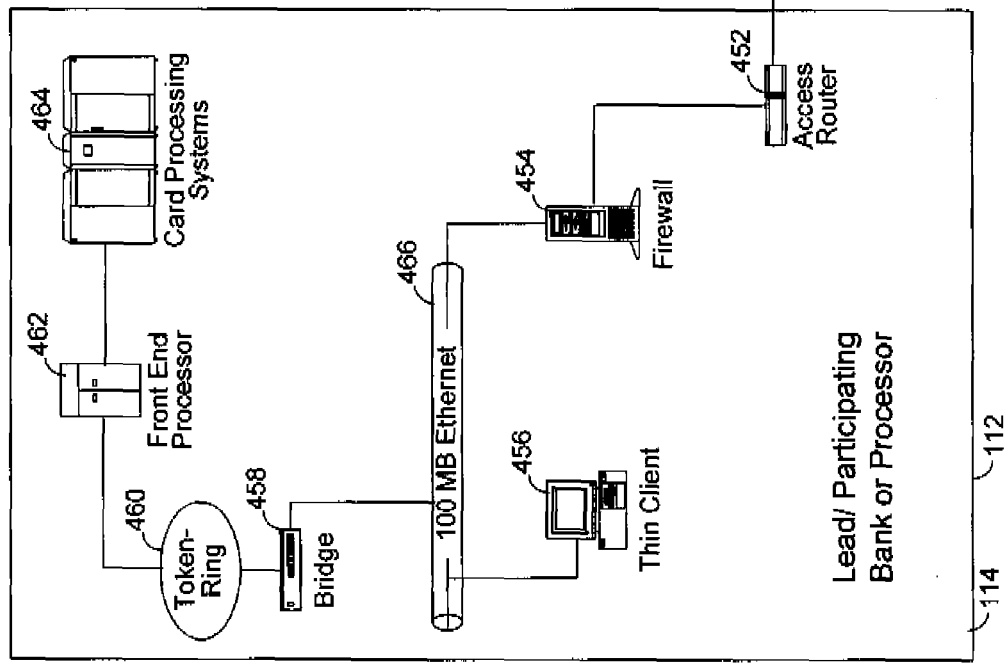
FIG. 20
Detailed Physical Architecture

Business Process Model for Multinational Commercial Card Program

| Function 602 | Participating Banks Primary Process Responsibilities 604a | Process Activities 606 | Data Required from Lead Banks 608 | Data to be Provided to Lead Banks 610 |
|---|---|---|---|---|
| Client Setup & Enrollment 504 | Cardholder Enrollments | •Pre-approval Application Processing<br>•Application Acceptance<br>•Credit History Review<br>•Credit Scoring<br>•Credit Line Limit Assignment<br>•Variable Product Attribute Assignment<br>•MCC Assignments<br>•Purchase Limits Assignment<br>•Billing Cycle Limits<br>•Risk/Credit Assessment Rating<br>•Applicant Approval<br>•PIN Assignment & Notification<br>•Collect Cardholder Data Disclosure Agreements<br>•Issue Cardholder Agreement Notifications<br>•Billing & Reporting Hierarchy Assignment | •Client Service Agreements<br>•Client Billing Hierarchy<br>•Client Reporting Hierarchy<br>•Cardholder Data Disclosure Agreements<br>•Affiliate Disclosure Agreements<br>•Account Ranges by Country by Currency by BIN<br>•Client Non-enrolled Employee Lists<br>•Product Specifications | •Accounts<br>•Accounts relationships to Client Billing & Reporting Hierarchies |
| | Plastic Issuance | •Develop Card Design<br>•Setup Inventory control processes<br>•Determine card re-issuance policy<br>•Develop PIN Mailer Procedures<br>•Encoding, Embossing & Mailing<br>•PIN Creating and Mailing<br>•CVV & CVC Calculations<br>•Card account Assignment<br>•Card Renewal<br>•Manage Plastics Inventory<br>•Lost/Stolen Card Replacement<br>•Welcome Package<br>•Negative File Notification | •Account Ranges by Country by Currency by BIN<br>•Plastic (Media) | •Card Numbers Assigned |
| | Card Activation | •Card Receipt Verification<br>•Master File Activation | •None | •Card Numbers Activated |

*FIG. 22A*

Participating Bank Data Requirements

| Function | Participating Banks Primary Process Responsibilities | Process Activities | Data Required from Lead Banks | Data to be Provided to Lead Banks |
|---|---|---|---|---|
| Transaction Processing  506 | Authorizations | • POS Interchange Network Integration<br>• Implement Authorization Decision Rules<br>• Handle Negative File<br>• MCC Blocking<br>• Transaction Approvals<br>• Handle VIP, Referrals & Declines<br>• Outstanding Tracking | • Authorization Rules | • Authorization MIS (e.g. # of referrals, # of declines, # of blocked MCCs, # of CVV Failures) |
| | Financial Capture and Transaction Posting | • Financial Transaction Capture and Balancing<br>• Authorization to Financial Matching<br>• Finance Charges<br>• Late Fee Charges<br>• Temporary Credits/ Charge backs<br>• Transaction Balancing<br>• Transaction Routing<br>• Invalid Transaction Correction | • Client Service Agreements<br>• Client Billing Hierarchy<br>• Client Reporting Hierarchy<br>• Product Specification | • Cardholders<br>• Accounts<br>• Financial Transactions (Debit, Credits, Remittances, Adjustments, etc)<br>• Daily Spot Rates |
| | Billing, Remittance & Statement Processing | • Individual Bill/ Individual Pay<br>  ✓ Cycle cut<br>  ✓ Issue Cardholder Statements<br>  ✓ Cardholder Expense Submission<br>  ✓ Cardholder Reimbursements<br>  ✓ Cardholder Remittances<br>• Individual Bill/ Central Pay<br>  ✓ Cycle Cut<br>  ✓ Issue Cardholder Statements<br>  ✓ Cardholder Expense Submission<br>  ✓ Cardholder Reimbursements<br>  ✓ Corporate Remittances<br>• Central Bill/ Central Pay<br>  ✓ Cycle cut<br>  ✓ Issue Consolidated Statements to Company<br>  ✓ Cardholder Expense Submission<br>  ✓ Cardholder Reimbursements<br>  ✓ Corporate Remittances<br>• Perform Open Item Accounting<br>• Automated Debits for Payments to Other Entities<br>• Issue Interchange Settlements<br>• Provide Statement Messaging<br>• Maintain Statement History | • Client Service Agreements<br>• Client Billing Hierarchy<br>• Client Reporting Hierarchy<br>• Product Specifications | • Cardholders<br>• Control Accounts<br>• Accounts<br>• Account Balances<br>• Account Statements |

*FIG. 22B*

| Function | Participating Banks Primary Process Responsibilities | Process Activities | Data Required from Lead Banks | Data to be Provided to Lead Banks |
|---|---|---|---|---|
| | Rewards Accounting | • Bonus Point Calculations<br>• Handle Program Adjustments<br>• Cash Back Accounting<br>• Loyalty Credits<br>• Feed Data Extracts to Partner Programs<br>• Reward Statement Generation and Distribution<br>• Tax Calculations | • Reward Program Rules | • Reward Accounts<br>• Reward Account Balances<br>• Reward Account Statements |
| | Client Data Aggregation | • Link Statements to Reporting and Billing Hierarchies<br>• Non-Financial Data Matching<br>• Level II Data Capture<br>• Data Feeds to Cardholder for Expense Management<br>• Accumulate Billing and Reporting Summaries<br>• Generate Departmental Expense Reports<br>• Generate Corporate Client G/L Feeds<br>• Sales Force Commissions Processing | • Client Billing Hierarchy<br>• Client Reporting Hierarchy<br>• Client Cost Account Allocations | • G/L Extracts<br>• Transactional Data for Expense Vouchers<br>• Departmental Expense Extracts<br>• Billing Aggregations<br>• Reporting Aggregations |
| Cardholder Services<br><br>508 | Cardholder Servicing | • Establish Discretionary Adjustment Policy<br>• Establish Standard Adjustment Waivers<br>• Formulate "Special Case" Escalation<br>• Provide General and Client Agreement Information<br>• Update Cardholder Characteristic Data<br>• Handle Reward Redemption Requests<br>• Handle Multiple contact Channels (Phone, Mail, and Internet)<br>• Contact History Tracking and Access<br>• Voice Response Unit<br>• Letter Processing<br>• Case and Complaint Tracking and Actions<br>• Initiate Replacement and Renewal Cards<br>• Initiate Emergency Card Replacement<br>• Initiate Emergency Cash Fulfillment<br>• Process Line of Credit Changes | • Client Service Agreements<br>• Product Specifications<br>• Cardholder Agreement | • Cardholder Service MIS (e.g. # calls, blocked calls, avg. call time, # case, average case resolution time, # address changes, avg. amount of fee adjustments, average actions per account)<br>• Updated Accounts<br>• Financial Transactions (e.g. Credit Adjustments) |

*FIG. 22C*

| Function | Participating Banks Primary Process Responsibilities | Process Activities | Data Required from Lead Banks | Data to be Provided to Lead Banks |
|---|---|---|---|---|
| | Charge Dispute Handling | • Case History Maintenance<br>• Escalation Procedure<br>• Temporary Credits/ Charge back Initiation<br>• Binding Resolution | • Dispute Rules (from Assoc. Operating Regulations and Lead Bank Exceptions) | • Disputes MIS (e.g. # disputes, average charge back $$, temp. credits outstanding, write-offs, average time to resolve, average per account)<br>• Financial Transactions (Temporary Credits, Chargebacks) |
| | Feedback & Cardholder Service Analysis | • Maintain Cardholder Service Statistics<br>• Complaint Tracking and Analysis<br>• Cancellation Reason Analysis<br>• Call Reason Analysis | • Cardholder Survey | • Survey MIS (e.g. # surveys done, # of complaints by type) |
| Collections | Receivables Aging | • Account Transaction Aging<br>• Outstanding Analysis<br>• Write-off Liability Provisioning/Calculations | • Collections Policy | • Aging by Account<br>• Outstanding Summaries |
| | Internal Collections<br><br>510 | • Collection Scripting (full series 30-180 days)<br>• Automated Dialing<br>• Call Tracking<br>• Follow-up on Promises to Pay<br>• Corporate Notification of Late Payments<br>• Immediate Notification and Posting of Past Due Payments<br>• Collection Agency Migration<br>• Charge-off/ Charge to Corporation<br>• Account Closings Recovery of Delinquent/ Charged-off Accounts<br>• Authorization Flags | • Collections Policy | • Collections MIS (e.g. # calls, average collections, percent collected)<br>• Write-offs |

*FIG. 22D*

| Function | Participating Banks Primary Process Responsibilities | Process Activities | Data Required from Lead Banks | Data to be Provided to Lead Banks |
|---|---|---|---|---|
| | External Agency Collection | • Send Cardholder Account to External Agency<br>• Write-off Tracking<br>• Recoveries Tracking<br>• In/Out with Credit Bureaus<br>• Collection Fee Tracking | •External Agency Policy | •Collection Agency MIS (e.g. # survey done, # of complaints by type)<br>•Recoveries<br>•Collection Fee Invoices |
| Risk Management & Fraud Prevention<br><br>514 | • Overdue Account Tracking & Analysis | • Identify Overdue Accounts<br>• Account Closings<br>• Analyze Collections Portfolio | •Aging Parameters | • Outstanding Summaries<br>• Aging by Account |
| | • Risk Management | •Develop Risk Models<br>•Out-of-Pattern Cardholder<br>•Spending Behavioral Scoring and Analysis<br>•Fraudulent Charge Detection on Cardholder Accounts<br>•Fraud Scanners (e.g. CVV)<br>•New Fraud Trends<br>•Early Warning System | •Risk Parameters<br>•Authorization Parameters | •Write-offs |
| | •Negative and Exception File Updates | •Update Negative Files<br>•Update Exception Files | •None | •None |

FIG. 22E

| Function 602 | Lead Banks Primary Process Responsibilities 604b | Process Activities 606 | Data Required from Participating Banks 608 | Data to be Provided to Participating Banks 610 |
|---|---|---|---|---|
| Marketing & Sales 502 | Market Research & Brand Advertising | • Market Research<br>• Competitive Analysis<br>• Brand Strategy<br>• Brand Advertising<br>• Advertising Programs<br>• Advertising Effectiveness | • None | • None |
| | • Product Development | • Concept Evaluation<br>• Product Definition<br>• Positioning & Packaging<br>• Capabilities Definition<br>• Business Alliances Contracting<br>• Business Alliance Operations<br>• Integration & Infrastructure Development<br>• Product Performance Measurement | • Participating Bank Menu of Services | • Product Specifications<br>• Account Allocations by Country by Currency by Product BIN |

*FIG. 23A*

Lead Bank Data Requirements

| Function | Lead Banks Primary Process Responsibilities | Process Activities | Data Required from Participating Banks | Data to be Provided to Participating Banks |
|---|---|---|---|---|
| | • Corporate Sales | • Sales Forecasting<br>• Sales Territoy/Call Management<br>• Proposal Preparation/ Response<br>• Contract Negotiations<br>• Product & Capabilities Modifications<br>• Program Design, Policies and Procedures<br>• Establish Control Levels and Individual Card Limits<br>• Establish MCC restrictions and other purchasing constraints<br>• Establish Type of Liability<br>• Establish Payment Parameters (e.g. grace period, billing cycle, fees, payment mechanisms)<br>• Establish program goals<br>• Client Agreement Setup<br>• Client Program Performance Measurement<br>• Sales Force Measurement | •Participating Bank Menu of Services | • Client Service Agreements<br>• Cardholder Agreements<br>• Client Non-enrolled Employee Lists |
| | • Supplier Relations | • Strategic Partnership Development<br>• Partnership Agreement Setup<br>• Client Supplier Negotiations<br>• Client Supplier Spending Analysis<br>• Share Shift Analysis | •None | • Multinational Supplier Agreements |
| | • Client Relationship Management | • Client Net Contribution Analysis<br>• Client Retention Programs<br>• Attribution Prediction<br>• Client Segment Migration<br>• Client Profiling<br>• Cross-sell Program Identification<br>• Cross-sell Program Development<br>• Account Reviews | •Accounts<br>•Collection Agency MIS<br>•Authorization MIS<br>•Cardholder Survey<br>•Collections MIS<br>•Cardholder Service MIS<br>•Disputes MIS<br>•Survey MIS | • Dispute Rules<br>• Reward Program Rules |

*FIG. 23B*

| Function | Lead Banks Primary Process Responsibilities | Process Activities | Data Required from Participating Banks | Data to be Provided to Participating Banks |
|---|---|---|---|---|
| Client Setup & Enrollments 504 | • Client Setup & Maintenance | • Client Reporting Hierarchy Setup & Maintenance<br>• Client Billing Hierarchy Setup & Maintenance<br>• Establish Affiliate Addenda<br>• Implement Data Privacy Constraints<br>• Client BIN Account Range Allocation | • None | • Client Billing Hierarchy<br>• Client Reporting Hierarchy |
| | • Supplier Setup & Maintenance | • Supplier Profile and Chain Setup & Maintenance<br>• Supplier Discount Program Maintenance<br>• Non-financial Data Provisioning Setup<br>• Purchase Card Program Setup<br>• Client Supplier Enrollments<br>• Client Supplier Enrollments<br>• Client Supplier Pricing Maintenance | • None | • Multinational Supplier Profiles<br>• Multinational Supplier Discounts |
| Client MIS Reporting 512 | • Define set of standard MIS report templates and data feeds | • Template Definition<br>• Data Source Mapping<br>• Data Feed Templates<br>• Distribution Channels | • None | • None |
| | • Clients' selecting of desired report formats and data feeds | • Client Report Definition<br>• Client Report Distribution Lists<br>• Provide ad-hoc reports<br>• Data Extract Definition | • None | • None |
| | • Automatic report and data generation at customer-specified frequency | • Data Collection<br>• Data Conditioning<br>• Data Enrichment<br>• Report Initiation<br>• Data Extract Initiation<br>• Report/Data Receipt Confirmation<br>• Ad hoc reporting | • None | • None |
| Risk Management & Fraud Prevention 514 | • Credit/Risk Policy | • Risk Assessment<br>• Risk Policy Setting<br>• Determine Overlimit and Collections Policies<br>• Risk Parameters<br>• Aging Parameters<br>• Authorization Parameters<br>• Establish Credit Line Policy | • None | • Authorization Rules<br>• Risk Parameters<br>• Aging Parameters |

*FIG. 23C*

| Function | Lead Banks Primary Process Responsibilities | Process Activities | Data Required from Participating Banks | Data to be Provided to Participating Banks |
|---|---|---|---|---|
|  | •Collections Analysis | • Fee Collection Analysis<br>• Fee Reconciliation<br>• Collection Agency Relationship Management | • None | • External Collection Agency Policy |
| Business Performance Management<br><br>516 | •Portfolio Performance/ Risk Measurement | •Portfolio Performance/Risk Management | •None | •None |
|  | •Profitability Measurement | •Profitability Measurement | •None | •None |
|  | •Customer Satisfaction Analysis | •Customer Satisfaction Analysis | •Survey MIS | •None |
|  | •Forecasting & Budgeting | •Forecasting & Budgeting | •None | •None |
|  | •Financial & Management Reporting | •Financial & Management Reporting | •None | •None |
|  | •Statutory & Tax Reporting | •Statutory & Tax Reporting | •None | •None |

*FIG. 23D*

Data Exchange Subject Areas

PAYMENT SERVICES FOR MULTI-NATIONAL CORPORATIONS

This application is a divisional of U.S. patent application Ser. No. 10/138,182 filed May 1, 2002 now U.S. Pat. No. 7,783,568, which in turn claims priority of U.S. provisional patent application No. 60/288,198, filed May 1, 2001, both of which are hereby incorporated by reference.

FIELD OF THE INVENTION

The present invention relates generally to international business relationships and the processing of financial data. More specifically, the present invention relates to techniques for arranging and implementing a multi-national card program.

BACKGROUND OF THE INVENTION

In 1998, it was estimated that the top 100 global corporations had a value of purchases and cash advances of 32.5 billion dollars that was charged to their corporate cards. A corporate card is typically a credit card or charge card used by employees to pay for travel and entertainment expenses, for example. These global corporations also make use of purchasing cards for use in purchasing supplies and equipment needed by the corporation. The dollar value charged to these corporate cards and purchasing cards each year is enormous. Not surprisingly, the major organizations through which such cards are issued (e.g., Visa, MasterCard, American Express, and Diners Club) are vying for a portion of this business.

For a financial institution (e.g., a bank or similar organization) that is not part of a unified global company it can be difficult to bid on this card business for a multi-national corporation or a governmental agency. These financial institutions which issue such cards (henceforth referred to as "card issuer"), usually only issue cards in their own country, i.e., their principal country of business. Unfortunately for these card issuers, multi-national corporations are requiring that a corporate or purchasing card be issued to their employees in many different countries. For example, a multi-national corporation such as IBM may have employees not only in the United States but also in fifty other different countries, and may also have eight or more main offices, each in a different country. When such a multi-national corporation releases a request for proposal (RFP) to implement a corporate or purchasing card program, a local U.S. card issuer often cannot respond to such an RFP because they would be unable to supply the required services in all the different countries required. Even though the local U.S. card issuer would be more than happy to implement the U.S. portion of such a program for IBM and support only the domestic business, it may be unable to submit a competitive bid, as it cannot support the international portion and offer a global business solution to the multi-national corporation. In other words, a local card issuer often cannot meaningfully provide the global services required by a multi-national corporation and, as a result, it may lose out on receiving the domestic business as well.

Another difficulty in responding to an RFP from a multi-national corporation is that the corporation may expect a response (including proposed agreements) within a short time frame, often within two to three weeks of issuance of the RFP. A local card issuer that does not have a global presence or an ability to line up a counterpart bank in a different country would find it extremely difficult to respond to such a request within the required time frame.

Governments also have needs for global card programs. For example, most all governments have foreign service officers serving in countries around the globe and many have military personnel serving overseas as well. As a result, governments are also looking to provide these overseas workers with payment vehicles, like credit and charge cards, that can help them manage their overseas office and military budgets and spending more efficiently.

In addition, the U.S. government, for example, may have prohibitions on using card issuing institutions that are not U.S. based for purposes of issuing such credit or charge cards to their overseas personnel.

In addition to a local card issuer finding it difficult to bid on a global card program, there are other difficulties. For example, multi-national corporate credit or charge card accounts are far more complex then a regular consumer credit or charge card account because of the variety of agreements that need to be signed. In addition, assessing credit risk of the individual cardholder and/or company subsidiary in foreign countries can be challenging. Furthermore, card issuers must comply with local regulations.

Another major difference between consumer and corporate cards is the amount and quality of data that must be collected for each transaction due to requirements imposed by the corporations. For example, a corporation may require itinerary details about airline flights and an itemization of charges to hotel bills in order to assist the corporation with analyzing its expenses. Furthermore, on purchasing cards, a multi-national corporation may request substantial detail about all transactions, including any taxes paid in order to be able to claim a rebate for value-added tax purposes. Such requirements can complicate the ability of a local card issuer to service and provide a global card program. A card issuer with only a local presence and even one with limited global presence will find it much more difficult to meet these requests that often span many countries. In sum, local card issuers often find it difficult to win the global business of multi-national corporations because the accounts are much more complex, require more intensive data gathering, and the local card issuer often has no global presence or servicing capabilities.

This difficulty encountered by local bank in a given country in responding to a multinational request for global issuance of corporate or purchasing cards can also extend to a large international bank that has a local presence in a variety of countries. While many of these international banks may have a local presence in each country, their processing and client servicing capabilities are often very locally driven. More often than not, responsibilities over different lines of business of a large multinational bank do not cross between branches in different countries. This leads to difficulties in preparing a bid document, difficulties in understanding the bank's local capabilities, uncertainties in assuring a consistent level of customer service, etc.

To circumvent some of these problems, a bank may negotiate custom deals with other banks in other countries in order to provide the card issuing and servicing required to respond to a multi-national corporation's request for global issuance. For example, a U.S.-based bank with a client desiring corporate cards to be issued to employees in the U.S. and France may negotiate a bilateral one-time agreement with a French bank in order to provide a card program both in the United States and in France. These agreements, however, are by no means standardized, and typically can be quite cumbersome and time consuming to arrange. The data and servicing arrangements provided to the employees of the corporate client from these arrangements may also not be uniform or consistent. Moreover, enforcing consistency up to the levels expected by the multinational client is often problematic. While such arrangements can occur between banks of two different countries, agreements between three or more banks in different countries are much less common and obviously much more complex to successfully arrange and negotiate.

In summary, the problems with prior techniques are quite daunting, and include such issues as: a local bank may lack territorial coverage; a bank may not know its capabilities or those of its potential partner banks; the local bank may not be able to assemble a bid quickly and put multiple agreements between different partners in place within the time required to meet the demands of a potential client; the bank may not be able to guarantee a consistent standard of customer service; lack of standard card features; and the bank faces inconsistent and poorly organized data gathering techniques and systems for international card programs.

The above has addressed the difficulties with prior techniques primarily from a bank's perspective, i.e., why it can be difficult for a local bank to bid on and successfully win an RFP from a multi-national corporation. Equally important is the motivation for multi-national clients and understanding from the perspective of their specific needs. The multinational client requires the following four important components: a management information system (MIS) that encompasses a global approach, an account manager or executive that is responsible for the entire global relationship, a global approach to pricing, and quality customer service that is consistently provided across the entire program.

First, because a multinational corporation must be able to analyze its expenditures globally for all merchants with whom it does business, the information and data that arise from expenditures on a card program must be truly global and comprehensive. For example, a multi-national corporation may require a breakdown of all airline travel by individual carrier for all of its employees all over the world. Corporations use such global information not only to reduce their expenses, but also to help in negotiation to obtain the best corporate-wide pricing with a global merchant. Corporations need a consolidated MIS report of all local data, aggregated at the highest level for global reporting. Unless the card issuer has a global reach, it is difficult to gather all local country data, standardize it, aggregate it and produce a consolidated global MIS report for the multinational client.

Second, a multinational client would also like to have a single point of contact that is responsible for all their questions and maintenance for a global card program. If, for example, a multinational client has employees in twenty-five different countries, it is not efficient nor convenient to have to deal with twenty-five different card managers (or more) regarding problems with the card program in these countries. A client would naturally desire having a single global account executive who is responsible for the entire global program and has the authority and ability to deal with and solve specific questions or problems.

Third, clients also wish to have a global price or contract which takes into account any fees that are assessed, rebates granted or other. For example, if a client does not wish to pay annual card fees on a global basis, it can be a problem for an issuing bank in a single country in which a small number of cards are issued insists upon annual card fees. To satisfy the multinational client's desires, the card issuing bank would like to be able to promise to the client that no card fees will be assessed anywhere in the world. However, there may still be the need for the card issuing bank to accommodate the local card issuing bank in the other countries that insist on assessing card fees. Regarding rebates, a multi-national client with a large volume of charges on their cards will expect rebates from these charges, often on a seller by seller basis. A client may insist that the formula for calculating the rebate amount be negotiated globally and may require that the volumes going through particular sellers be applied worldwide. A single global price that includes any card fees and takes into account rebates is appealing to a corporation.

Fourth, a multinational client requires that customer service be available locally and of significant quality. As an example, a German company may require that a German branded card be issued to its employees, and that customer service for its German employees be provided locally, with German speaking customer service representatives, that statements be written in German, and that all transactions be denominated in local currency. Further, the local customer service center must be familiar with all local laws, regulations and customs. In addition, for transactions that take place within Germany, the merchant will likely wish to be paid in Deutsche marks or Euros, the multinational employee cardholder wishes to have their statement denominated in Deutsche marks and the client company wishes to pay their expenses in Deutsche marks. Local service also means handling all questions, increasing credit or spending limits, handling lost and stolen cards, handling fraud issues, etc. This need for local servicing applies to countries where the multinational has many thousands of employees and even for countries where that may be only a handful of employees who will be issued cards. The inability of a bank to provide such local servicing even in the market where a few cards are required may mean that the bank will not win the global business from the multinational client.

Certainly there are potential solutions to the above difficulties but they are often not optimal. It could be possible for a local bank (e.g., a U.S.-based card issuer) to issue its own corporate card in all foreign countries. This arrangement can be problematic because the local bank in a given country will normally find it very difficult to service and provide all of the processing required in all locales, including the multiple currencies and languages required for servicing the accounts on a local basis in all countries. This arrangement does not provide the local presence that is required. Legal compliance and local customs also provide substantial impediments to cross-border issuance. In addition, because the card issuing institution is not considered local in the overseas markets, transactions in those countries may incur foreign currency conversion fees. Moreover because of the distances involved between processing centers and residences of cardholders, statements and cardholder payments may take longer in transit between recipients, resulting in possible late fees. In addition, moving funds internationally to make payments on accounts can be costly and time consuming.

One approach would be to allow a local bank to issue cards in several countries, while engaging the services from a global card processor that processes all card transactions in all countries, or at least in several. Although theoretically possible, it can prove difficult to find a processor that will process in enough foreign countries. Typically such a processor will process transactions from the major countries but may not choose to process cards from particular countries, or if cards are processed in some countries the format and information supplied may be different from the major countries. For these reasons, for a local bank to issue its cards in all foreign countries is not especially desirable or workable as a solution.

Other approaches are possible but are also not ideal. It is possible to set up an international program whereby major banks in foreign countries are pre-qualified to participate in the program as long as they meet some threshold level of corporate card services. Then, for example, when a lead bank needs to negotiate an agreement with a client who desires corporate cards in ten different countries, the lead bank has access to the nine points of contact at the other banks in the foreign countries. The lead bank may then contact these other banks, propose an agreement, and/or negotiate details on behalf of the client. Although this arrangement is feasible, it still suffers from the drawbacks mentioned above. Namely, the client may eventually deal with ten different points of contact, will have different cards in ten different countries, will have ten different levels of customer service and may have to negotiate ten different prices for these services. Furthermore, there may not be adequate communication between the banks, or the banks may not have implemented standard data formats or desire to undertake the expense of doing so for a small amount of business on an ad hoc basis—this would mean an issuer may not be able to provide a standard data format for a client that desires a global management information systems approach. As mentioned, there would be no single global point of contact, no single global price, etc. Most importantly, the lead bank may not know the capabilities of the foreign banks, or even if apprised of these capabilities, it may not be able to guarantee a particular type of product or level of service to the client. Each individual bank in each country would be able to provide local servicing, but overall this approach does not meet many of the needs of clients addressed above.

Other entities have attempted to overcome these difficulties in different ways. For example, Citibank, which issues corporate and purchasing products, has branches worldwide. When it comes to responding to a request from a multi-national client, Citibank does not have to coordinate amongst a number of non-affiliated companies worldwide. Because they are a single entity, they know their capabilities, they know where they can issue cards, what the cost will be and when they can respond. Because it is a single entity, they have better control over individual branches and can coordinate much more easily. The organization Diner's Club also issues corporate and purchasing cards; it is owned by Citibank and benefits from Citibank's worldwide branches as well. American Express also issues corporate cards as a monolithic entity similar to Citibank. American Express has local subsidiaries in every major country, with local processing, card issuing, and local services and can coordinate to respond to a global RFP and can implement a global, standardized, integrated solution for the client. MasterCard does not itself issue cards and therefore relies on the capabilities of its member banks.

Thus, while a card issuer in a given country may have relationships with card issuers in other countries, its ability to compete for multi-national corporate and government clients is severely limited by lack of a well-defined process for assembling bids, pricing bids, managing customer service, as well as the lack of a comprehensive global processing and servicing capability.

SUMMARY OF THE INVENTION

The present invention provides a mechanism for bidding for, implementing and delivering uniform services to multi-national clients with a single point of contact and seamless global processes. An entity known as the Central Coordinating Body (CCB) enables banks to service the needs of multi-national commercial clients by providing standards, relationships, management (or coordination) protocols, problem resolution, processing, data sourcing and reporting capabilities. The present invention utilizes the existing infrastructure of local banks in foreign countries along with the services of CCB to provide a local bank with the capability to appear like a global bank to a prospective client. Through a variety of mechanisms more fully explained below, the local bank is provided with not only the knowledge of other foreign banks capabilities, but also can speak for these other foreign banks with the assurance that it can guarantee what it offers to clients.

The present invention contemplates the concept of a "lead bank" which services its multi-national corporate clients by issuing commercial card products and by processing local transactions. A "participating bank" services clients locally on behalf of the lead bank by also issuing commercial card products and by processing transactions in its local market.

CCB brokers the relationship between the lead and participating banks, sets operational standards and measures compliance. It is also contemplated that CCB will provide major business functions including: a menu of services; client implementation services; revenue management; card operations settlements; customer service; data exchange services; media exchange; quality assurance; and its own CCB internal administration. CCB operates a global commercial card processing system that provides data sourcing, consolidation and standardization, storage, reconciliation, matching to data, and management reporting. A global network links participant's commercial card processing systems to this global system.

The present invention uses a variety of features to provide distinct advantages to the banks who participate. In addition to using CCB as a central global processor, the present invention includes the features of standard agreements for all banks, a menu of services, a formal bid process, and a payment arrangement. Standard contracts (including standard provisions governing service features and service levels) are used to form a binding agreement between lead banks (who will negotiate directly with a multi-national client) and CCB, while leaving basic pricing terms and additional or custom services for negotiation between individual lead banks and their prospective multinational clients.

These lead bank agreements define (among other) the services that the lead bank can expect will be performed for the client by local banks in foreign countries, and the services to be performed by CCB. The counterpart is a standard agreement between participating banks and CCB. A participating bank is a bank who will service a client in a local country at the request of a lead bank. These participating bank agreements define (among other) which services a participating bank will provide for the client, thus providing advance assurances to the lead bank while it is negotiating with the client.

Secondly, a "menu of services," or list of services to be provided, is the specific mechanism by which a lead bank is apprised of the capabilities of participating banks in foreign jurisdictions. Preferably, both the lead bank and participating bank agreements obligate a participating bank to provide the services that it lists in its own menu of services. The menu of services can be embodied in many different forms. Primarily, the menu of services lists the services that are provided by a particular bank, the levels of services, in which countries a service is provided, prices, etc. The menu of services also provides availability of and access to marketing materials, access to legal information, access to participating banks policies, provides minimum standards for a card program and minimum of performance. When a lead bank receives an RFP from a multi-national client, the lead bank can review the menu of services for any number of banks in the target countries. It then is able to respond quickly to the client with a high degree of certainty that these other banks can provide those services listed at a particular price. The menu of services thus facilitates the bidding process.

The bidding process is a third important feature that the present invention introduces. The lead bank and participating bank agreements specify a particular bid process that is followed by a lead bank and CCB when an RFP is received from a multi-national client. Briefly, when a lead bank receives an RFP it then prepares a bid document based upon the requirements of the RFP and what the lead bank believes it can perform by reference to the menu of services. The menu of services permits or facilitates a timely response by the lead bank. The bid document is then sent to CCB which confirms the services and prices in the bid document based upon the menu of services. By reference to the menu of services, CCB is able to quickly determine whether individual participating banks in foreign jurisdictions can provide the services listed in the bid document and at the prices offered. Once confirmed, the bid document is returned to the lead bank which then forwards its bid onto the client. Thus, by reliance upon the agreements between banks and CCB, and the menu of services, a bid document which can be relied upon can be prepared quickly in response to an RFP.

The present invention also uses a unique payment arrangement to remedy difficulties in the prior art. For example, an international client way wish to have a corporate card internationally but may request that it not pay any yearly card fees. There may be a bank in a very small market, however, that wants to participate and issue a corporate card, but insists upon charging the client a small yearly fee per card. A lead bank that is trying to arrange a global card program for the client is then faced with the problem of trying to reconcile the client demand for no card fees globally with a local bank requirement that card fees are paid yearly. The dichotomy between the prices charged to the lead bank by the participating bank and the lead bank's ability to price its services independently permits the lead bank to reconcile the discrepancies between these costs and pricing requirements of the multinational client.

A similar situation can occur with respect to rebates. As mentioned early, a client often requires rebates from the issuing banks when large sales volumes are spent with merchants. In certain countries though (France, for example), an issuing bank will receive far less income from interchange fees and will have corresponding less money to rebate to a client. A problem can develop should a client demand a particular rebate level worldwide; many banks will be able to provide this level but a local bank in France, for example, may refuse to provide such a high rebate. A bank which is trying to negotiate a deal with a client on behalf of many local banks is then faced with the difficulty of trying to reconcile the client demand for a particular high rebate level worldwide with the refusal of a bank is a single local market to provide such a rebate level. The client may also require tier-based calculation for rebates; this can only occur when the calculation of rebates is centralized.

The present invention provides a unique solution to this problem by permitting (via the lead bank and participating bank agreements) all revenue from transactions received by a local bank to be sent to the lead bank. The lead bank will then simply pay each local bank a fee for the services provided by the local bank. The local bank is free to charge fees that return a profit and to raise or lower its fees for particular services; however, the lead bank is also free to decline to enter into an agreement with that particular local bank if it deems that the fees are too high. From the local bank point of view, it is irrelevant if it would theoretically lose money based upon revenue derived from card transactions minus fees because it will be paid an amount by the lead bank that presumably provides the local bank a reasonable profit. Because all revenue received by local banks is sent to the lead bank, the lead bank is able to calculate its costs and profit in order to implement a global card program for the client and can then offer the client a global contract at a global price. It then becomes a moot point that, for a portion of the global business, a local bank demands that yearly card fees be paid or that rebates be kept to a low level. Regardless of the local business model, the local bank will be paid for its services and the lead bank is able to offer a global price to a client knowing its costs and opportunity for profit.

This "revenue model" is one possible implementation of the present invention. One advantage of the invention is that it facilitates other models because of the inherent flexibility of the menu of services, the bid process, the opportunity to negotiate prices outside of the menu of services, and the data processing platform.

In another example of an advantage of the present invention, consider a problem that could arise with credit limits. A large client of a U.S. bank may require that all of its employees have a $20,000 credit limit on their corporate cards worldwide. In a country such as Argentina, for example, it may be difficult to extend such credit because of high inflation. A local Argentine bank may only offer a $10,000 credit limit. Because the local U.S. bank desires the business of the large client, it needs some mechanism to reconcile the demands of the client with the concerns of the Argentine bank. Because the U.S. bank and the Argentine bank have an indirect legal relationship with each other by virtue of the agreements they have with CCB, the U.S. bank is able to specify in its bid document to the client that it will underwrite the client in Argentina, thus allowing a $20,000 credit limit per card. Through this arrangement, the Argentine bank now feels comfortable offering a corporate card with a $20,000 limit because it has assurances that the U.S. bank will underwrite each card for the amount of $10,000. In this scenario, the lead bank would issue an open letter of credit to the participating bank and the participating bank may draw from this credit limit to offset its credit losses, providing specific protocols for credit processing, maintenance and collection are followed.

There is other similar prior art relating to extending credit, but it still does not provide a solution to the problems mentioned above. For example, the loan syndication process by which a syndicate of banks extends a large line of credit to a major corporation might be viewed as similar to a number of foreign banks desiring to extend credit to a multi-national corporation by way of many thousands of corporate cards held by the corporation's employees. Aside from that very high level analogy, however, the similarity ends.

The loan syndication process is quite different for two main reasons. In the first place, the business of assembling corporate loans and organizing a syndicate is a very well known, relatively simple process. Indeed, corporate loans are so common, they are like a commodity. There is only one currency to deal with and there are no local customer service issues, or many of the other issues that arise in the context of a corporate card program. The line of credit present in the loan syndication is typically a single credit—or a series of credits—in one currency to be used by the corporate treasurer for large financial requirements. The servicing and data requirements are minimal compared to offering many smaller lines of credit in multiple currencies. Further, there is no need for dispute or complaint resolution processes.

Secondly, the method for assembling a syndicate is somewhat the reverse of proposing an international card program for a multi-national corporation. For example, with a corporate card program the participating banks would initially provide a menu of all the services they provide and their costs to the lead bank. Based upon all this information, a lead bank is then in a better position to respond quickly to a request for proposal when one comes in from a client. On the other hand, the loan syndication process is somewhat the reverse. When the client approaches a bank with the need for loan, the bank turns about and approaches a variety of other banks and tells them what the deal is, what amounts it wishes they would provide, the terms of the loan, etc. For these reasons, although the loan syndication process at first glance might seem somewhat similar to the present invention, the two are quite dissimilar.

To summarize, the present invention provides numerous advantages to banks and to clients. The CCB provides a global servicing function to support bidding, implementation and customer service, and a global network is provided to exchange, store, process and deliver financial and cardholder data as required by the client. Through the lead bank and participating bank agreements, a single point of contact is provided for a multi-national corporate client. The menu of services, the bid process and the revenue model all provide unique advantages.

BRIEF DESCRIPTION OF THE DRAWINGS

The invention, together with further advantages thereof, may best be understood by reference to the following description taken in conjunction with the accompanying drawings in which:

FIGS. 12A-12D show one embodiment for organizing and publishing services, features and associated respective minimum levels of service.

FIGS. 13A-13D illustrate one possible option for a feature set and minimum levels of services for a purchasing card.

FIG. 19 illustrates an overview of possible CCB software applications.

FIG. 20 illustrates one embodiment of a physical architecture for the lead and participating banks, and for CCB.

FIGS. 22A-22E list data requirements of a participating bank.

FIGS. 23A-23D list data requirements of a lead bank.

DETAILED DESCRIPTION OF THE INVENTION

Figure 1:
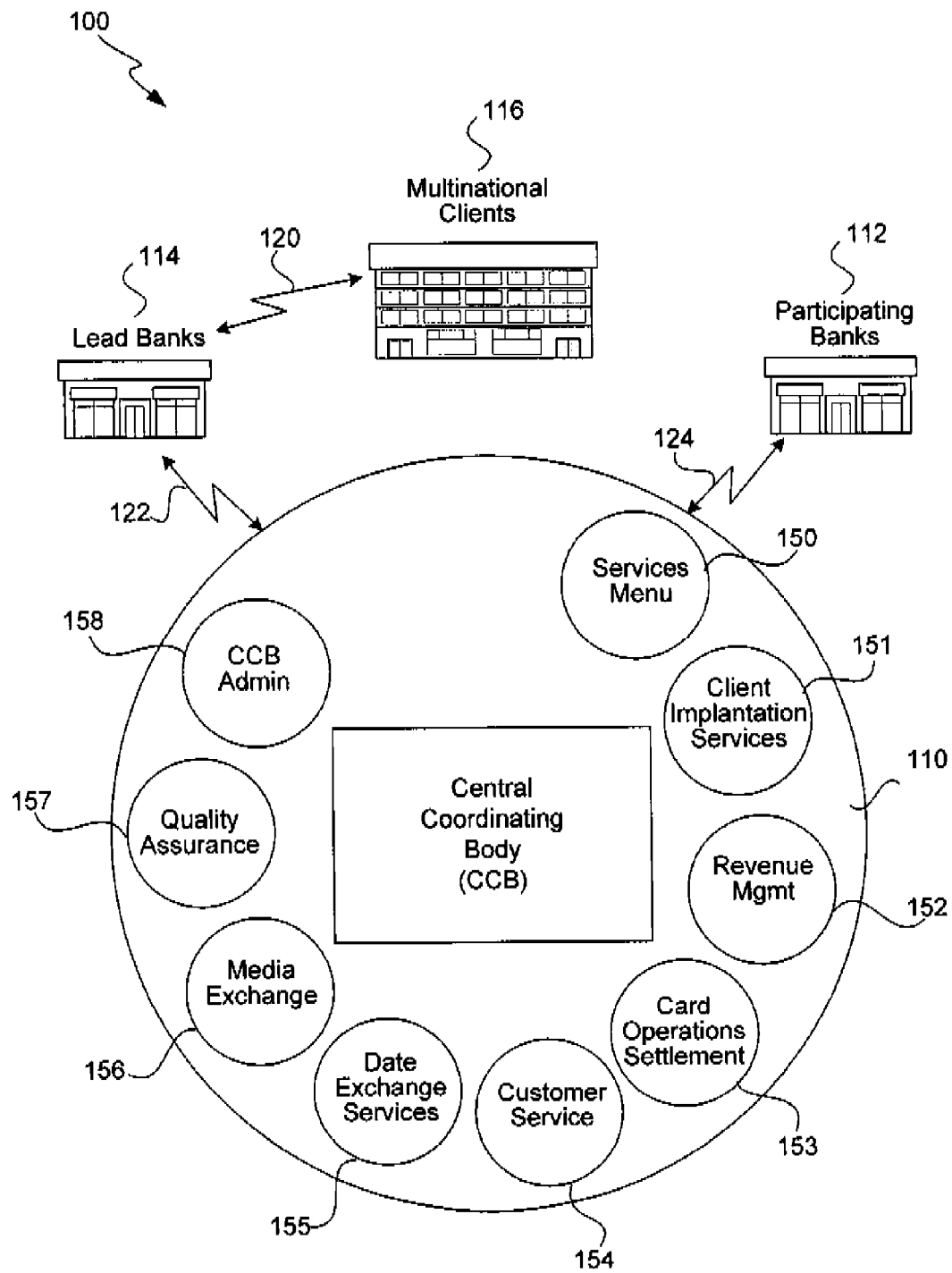
FIG. 1 is an overview of a global commercial card processing system according to one embodiment of the invention.

An entity known as the Central Coordinating Body (CCB) operates a global commercial card processing system. The system provides data sourcing consolidation and standardization, storage, reconciliation, matching to enhance data, and management reporting. A global network links the commercial card processing systems of the participants to this global system. In conceptual terms, the need arises for a CCB because the participants—entities that have the legal capacity to issue cards—typically may not have the capability to issue cards in diverse geographical locations. And, it is generally not economically feasible to develop such capacity to provide relatively small card payment services necessary in order to get large business in areas where they can issue cards.

A commercial card program for a multi-national client may be implemented in a variety of manners. By way of example, a lead bank may service its clients by issuing commercial products and by processing local transactions in geographical areas in which it has the ability to issue the cards. In a foreign country, a foreign branch of a lead bank may service the client by issuing commercial products, and by processing local transactions in the areas in which the lead bank has no such capabilities. Alternatively, a participating bank may service clients on behalf of a lead bank by issuing products and by processing local transactions. In another scenario, where a participating foreign bank may not have the processing capability to meet CCB standards, a lead bank may use the CCB local infrastructure and servicing capabilities to service the client by issuing products and by processing local transactions. A global network transports data between participating banks and CCB and between CCB and the lead banks. Banks may also choose to connect their third party vendors and third party processors.

A multi-national program is a program set up by a lead bank for a client and its affiliates for the provision of corporate cards, purchasing cards, virtual cards, and other payment services in various jurisdictions. As used herein, the terms "card program" and "corporate card" refer to those corporate cards used by a multi-national corporation to charge its travel and entertainment expenses as well as purchasing cards used by such a corporation to purchase services, supplies, materials, parts, and information. Furthermore, the term corporate card or card program is not limited to use of an actual physical card, but also refers to an electronic account (also known as a "ghost" account) that is used to pay for such items. For example, a corporation may have master account to which all airline travel is charged by each employee without the need for a physical card. Also, in the area of purchasing, a physical purchasing card need not be present, for example, when a corporation has an account number which is used for electronic purchasing. The terms corporate card and card program also refer to other payment and purchasing techniques such as use of a distribution card.

Further, the description herein makes frequent reference to a "lead bank" and a "participating bank" for ease of explanation. As mentioned earlier, a bank or similar financial institution which issues cards is referred to herein as a "card issuer." Thus the terms "lead bank" and "participating bank" broadly encompass any "lead issuer" or "participating issuer," respectively.

Global Commercial Card Processing System Overview

FIG. 1 is an overview of a global commercial card processing system 100 according to one embodiment of the invention. A Central Coordinating Body (CCB) entity 110 coordinates participating banks 112 in local countries on behalf of a lead bank 114 in order to implement a commercial card product multi-national program for a multi-national client 116. CCB entity 110 is preferably a company with limited liability (e.g., a corporation or limited liability company) formed to provide administrative and information technology support for lead banks in providing such multi-national programs for clients. CCB may also be formed of different separate entities (e.g., members or shareholders), may be a subsidiary or affiliate of another entity, or may also be structured as any legally recognized form of business entity.

Preferably, CCB has a governing body that adopts and implements a set of operating rules to direct the entity. In a preferred embodiment, the operating rules provide processes for CCB that are compatible with those of Visa International Service Association of Foster City, Calif. The Visa rules, though, do not govern the operation of CCB.

The card services that a lead bank may offer to a multi-national client may include any other services that the governing body of CCB decides to offer. CCB 110 includes a variety of business functions 150-158 which will be further explained in FIG. 2 and following. Of course, there may be a greater number of functions or fewer, depending upon the nature of services to be provided.

Lead bank 114 is any bank desiring to establish a relationship with a client to provide a multi-national card program. In general, bank 114 is any card issuer such as a bank, or any business with the legal capacity to issue cards and provide payment services. The present invention contemplates that a lead bank will purse a business relationship with a client 116 to provide a multi-national card program using the services of any number of participating banks 112 in various countries whose services are coordinated by and managed by CCB 110. Participating bank 112 is also any suitable card issuer which desires and has the ability to provide services to the lead bank in a given country via CCB as part of the multi-national card program. It is contemplated that a participating bank may also concurrently act as a lead bank for another card program and that a lead bank may also act as a participating bank at the same time. Multi-national client 116 is any suitable corporation that desires a multi-national card program. The term "multi-national client" or "client" is also used herein to refer to any governmental agency or international body that also desires a multi-national card program (e.g., the United Nations, Organization of American States, European Union, FIFA, etc.).

In general, the role of the lead bank is to lead sales and service activities, own the client relationship, manage credit risk and coordinate CCB's services to its clients. The lead bank is responsible for generating commercial card sales and providing the client with a global sales price. As part of owning the client relationship, the lead bank will also be responsible for servicing the clients MIS needs. Regarding the management of credit risk, the lead bank is responsible for establishing reasonable credit risk parameters by jurisdiction and by assuming the global credit risks of the multi-national card program. In order to coordinate with CCB, the lead bank will provide CCB with statistical and financial information necessary to manage the multi-national client program and during the bid process will notify CCB of service requests that are outside the menu of services.

The role of the participating bank is to provide local card issuance services, accounting services, coordination with CCB, and data transmission. The participating bank services include many of a variety of services necessary to implement the multi-national card program for the client in a particular jurisdiction. The services include: issuing cards and/or products; processing authorizations within guidelines of the client service agreement; managing card accounts (e.g., card activation, replacement); client services such as billing and dispute resolution; data management services; risk management services; clearing and settling in currencies determined by the agreement; providing treasury and cash management service; rendering statements, cardholder agreements and other documentation in a local language and currency; providing local language servicing; managing receivables according to the agreement, and maintaining a cardholder and transaction file database. Utilizing local issuers ensures that global servicing requirements are performed in conformance with local customs and commercial and social practices.

Regarding accounting services, the participating bank may transfer all client program revenues to the lead bank and will maintain a fee schedule for its services. The participating bank will bill CCB for these services provided. The participating bank will also coordinate with CCB by notifying CCB of the services to be included in the menu of services and by meeting minimum standards for service and performance. The bank will also extract and transmit data related to multi-national client programs required by client.

Links 120, 122 and 124 represent not only communication but also legal relationships between the parties. For example, the lead bank and the client will ultimately enter into an agreement for the provision of a card program. Similarly, a lead bank will enter into an agreement with CCB for the provision of services, and CCB will enter into an agreement with a participating bank for the provision of local services. Regarding communication, link 120 is any suitable link (or links) by which the lead bank negotiates with, transfers documents to, and distributes MIS reports to client 116. Links 122 and 124 represent a portion of the CCB global network. When raw data is transferred, any suitable telecommunications network may be used.

For access to MIS information, it is contemplated that the links may use an ASP-type (Application Service Provider) network, i.e., communication may be Internet or web based. For customer service communications it is contemplated that the links will comprise telephone, facsimile, electronic mail and other similar communication means.

Figure 2:
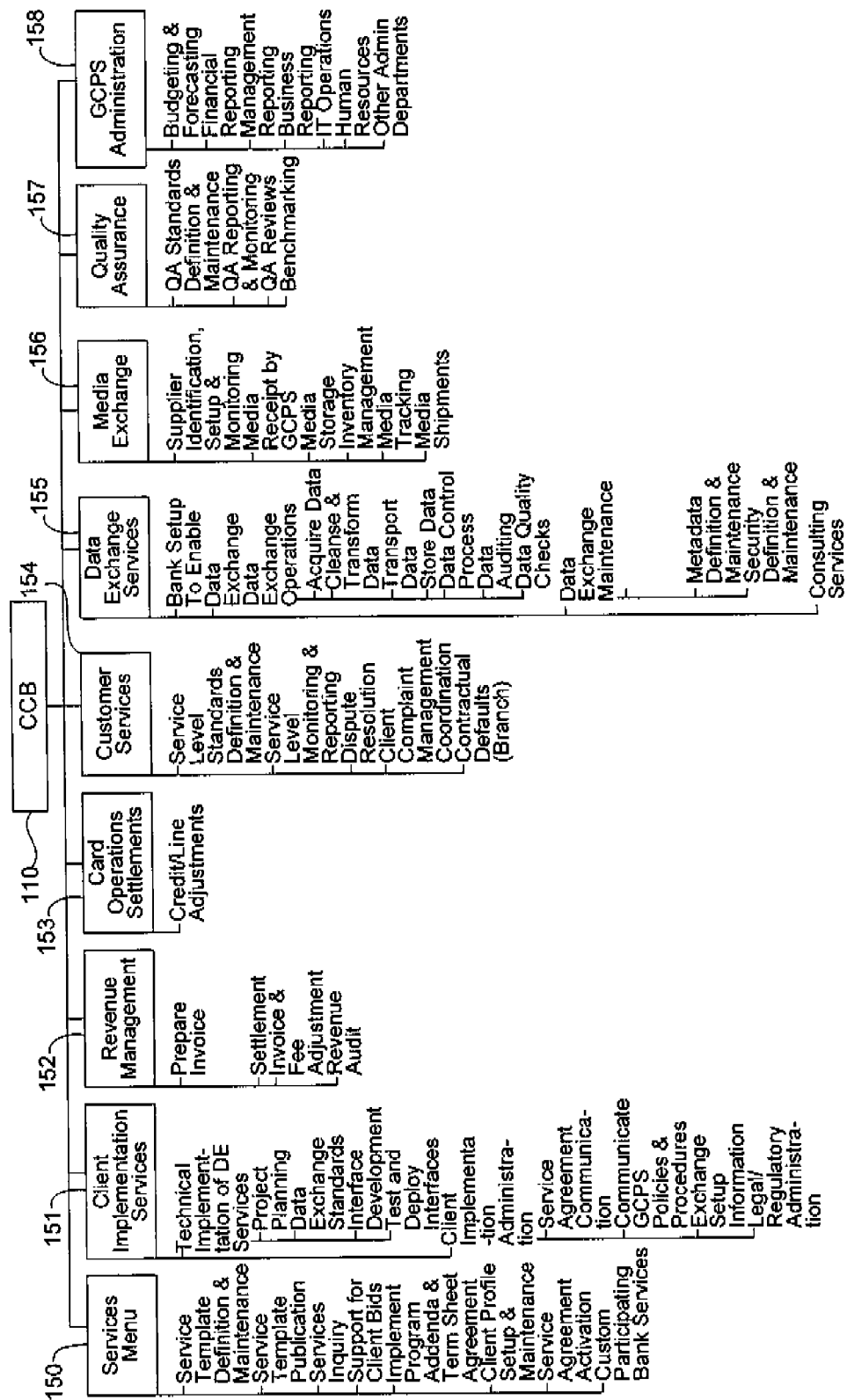
FIG. 2 is a functional decomposition of each of the business functions of the CCB entity shown in FIG. 1.

FIG. 2 is a functional decomposition of each of the business functions of the CCB entity shown in FIG. 1. Listed below each function are the processes that are performed within each. Many of the functions listed will be familiar to those of skill in the art of card processing. The other processes will be described herein.

CCB Business Functions Detail

FIGS. 1 and 2 have illustrated at a high level the major business functions 150-158 of one possible implementation of a CCB entity including various sub-processes. FIGS. 3-11 show in greater detail the processes involved in implementing these major businesses functions. One of skill in the art viewing these figures and the associated text will be familiar with various means by which to implement these processes.

Figure 3:
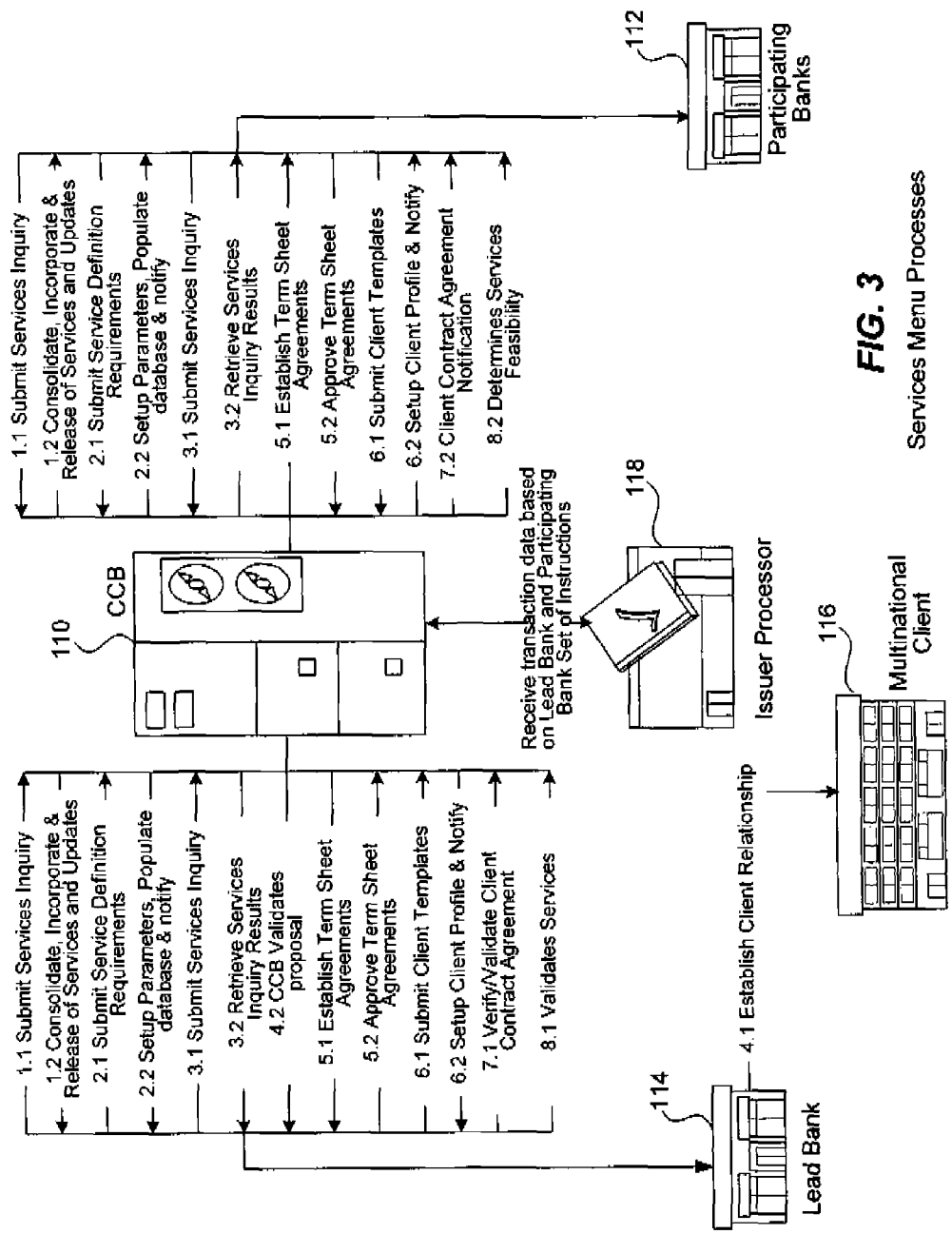
FIG. 3 illustrates the processes associated with the services menu business function.

FIG. 3 illustrates the processes associated with the services menu business function 150. The services menu establishes standard descriptions of services and service levels that a participating bank provides. CCB publishes this menu of services for lead banks, which may be amended from time to time. The menu specifies: participating bank services available; participating banks in each jurisdiction; CCB services available in various jurisdictions; service levels applicable to the services; any deviations from standard services in each jurisdiction; the time period from which such services are committed to by participating banks; CCB' pricing for such services; and other information necessary for lead banks to effectively respond to a client RFP.

Figure 4:
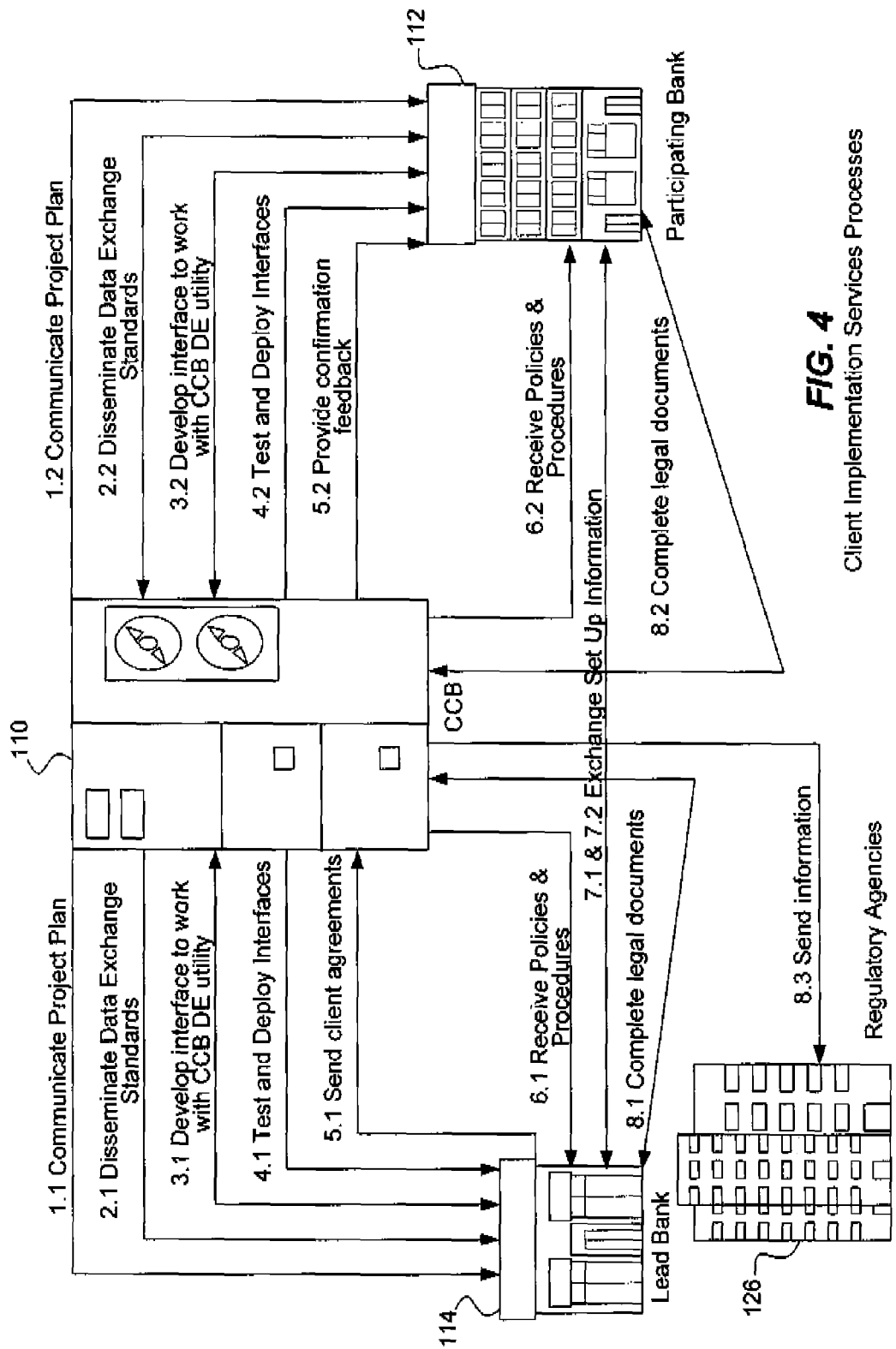
FIG. 4 illustrates the processes associated with the client implementation services business function.

FIG. 4 illustrates the processes associated with the client implementation services business function 151. Client implementation services assist with setting up a client on the overall global commercial card processing system. Once set up, the client's card transactions may be processed over the system. This function has two sub-processes, technical implementation and administration. Technical implementation involves project planning, communicating data exchange standards, interface development, testing and deployment. Successful completion of the technical implementation sub-process insures that the client will be operational. The administration sub-process involves service agreement communication, communication of CCB policies and procedures, exchange setup information and legal and regulatory administration (e.g., with regulatory agencies 126). Successful completion of the administration portion insures that services provided to the client will operate within the terms specified in contractual agreements.

Figure 5:
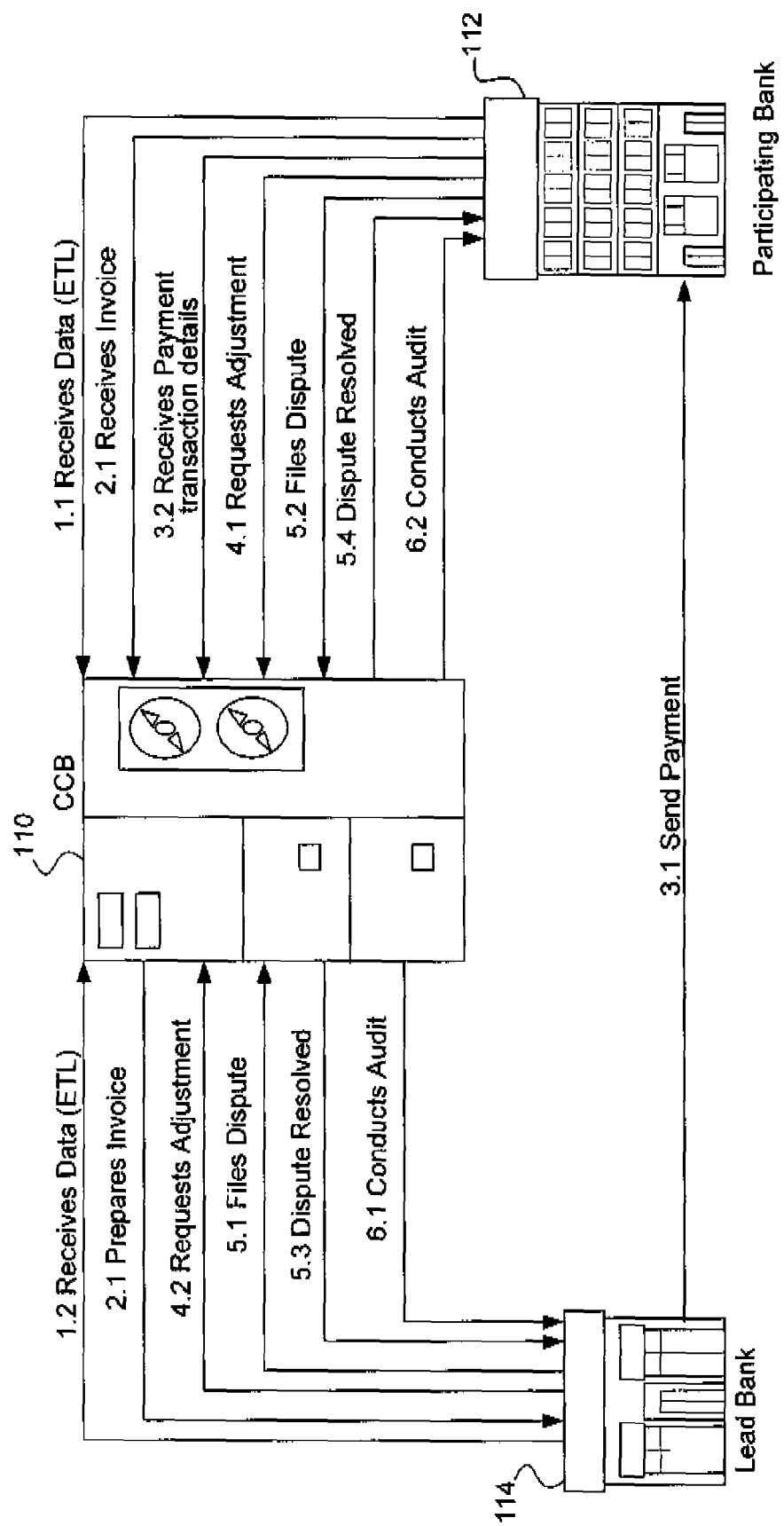
FIG. 5 illustrates processes associated with the revenue management business function.

FIG. 5 illustrates processes associated with the revenue management business function 152. Revenue management involves the aggregation of fees as set forth in the negotiated contracts. A participating bank sends invoices for services it renders on behalf of a lead bank to CCB. CCB will then forward the invoice to the lead bank with an extra line item added for the CCB services fee. CCB also performs auditing functions to insure the completeness and accuracy of the fees owed. For fee payment, either the lead bank will pay CCB, which then pays the participating bank, or the lead bank may pay the participating bank directly.

Figure 6:
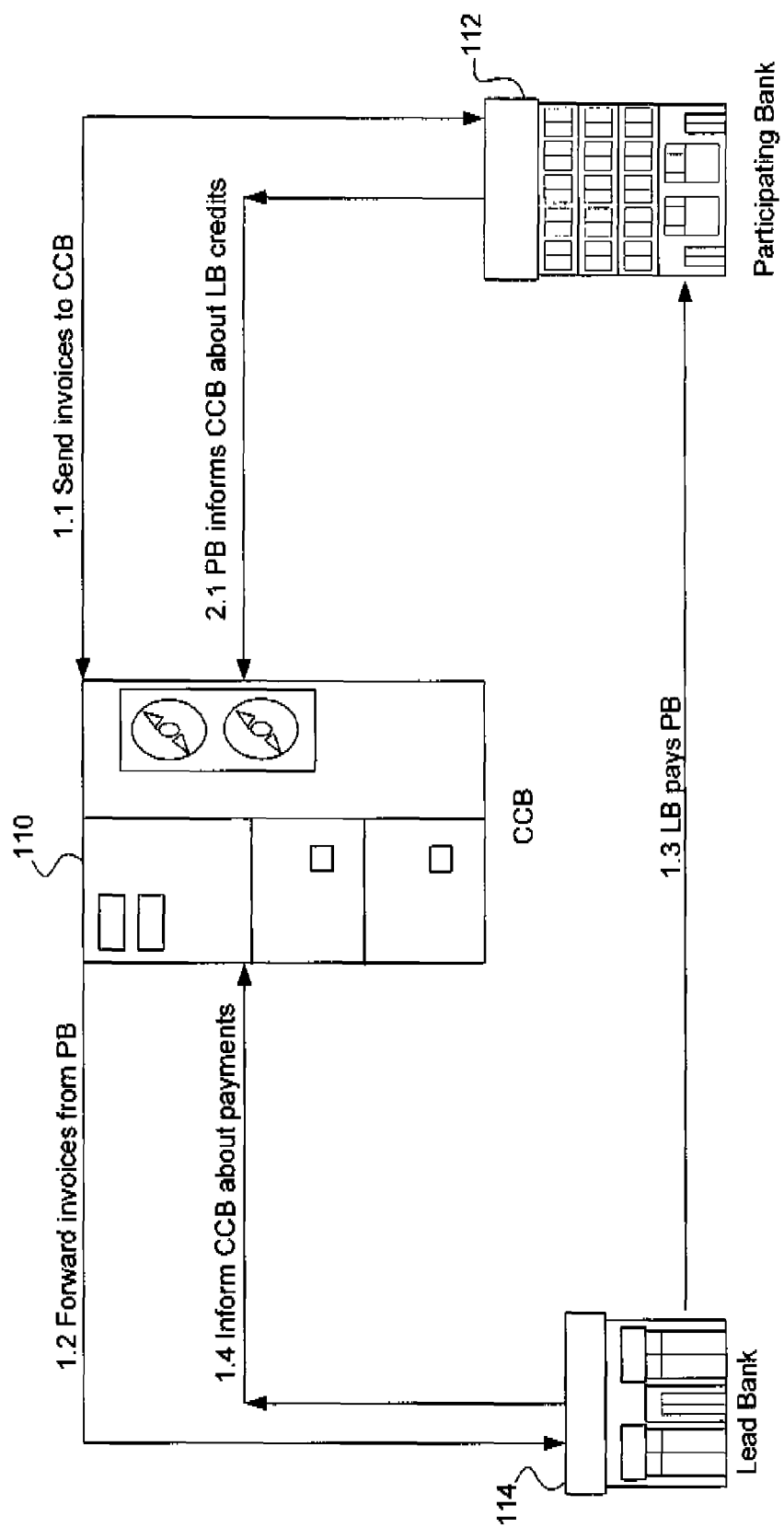
FIG. 6 illustrates processes associated with the card operations settlement business function.

FIG. 6 illustrates processes associated with the card operations settlement business function 153. This function assures that revenue collected by the participating bank but which belongs to the lead bank, is passed by the participating bank to the lead bank. It also assures that losses incurred by the participating bank but are actually are attributable to the lead bank are passed from the participating bank to the lead bank. If necessary, the participating bank or lead bank informs CCB that a credit adjustment is required, and then the adjustment will be made.

Figure 7:
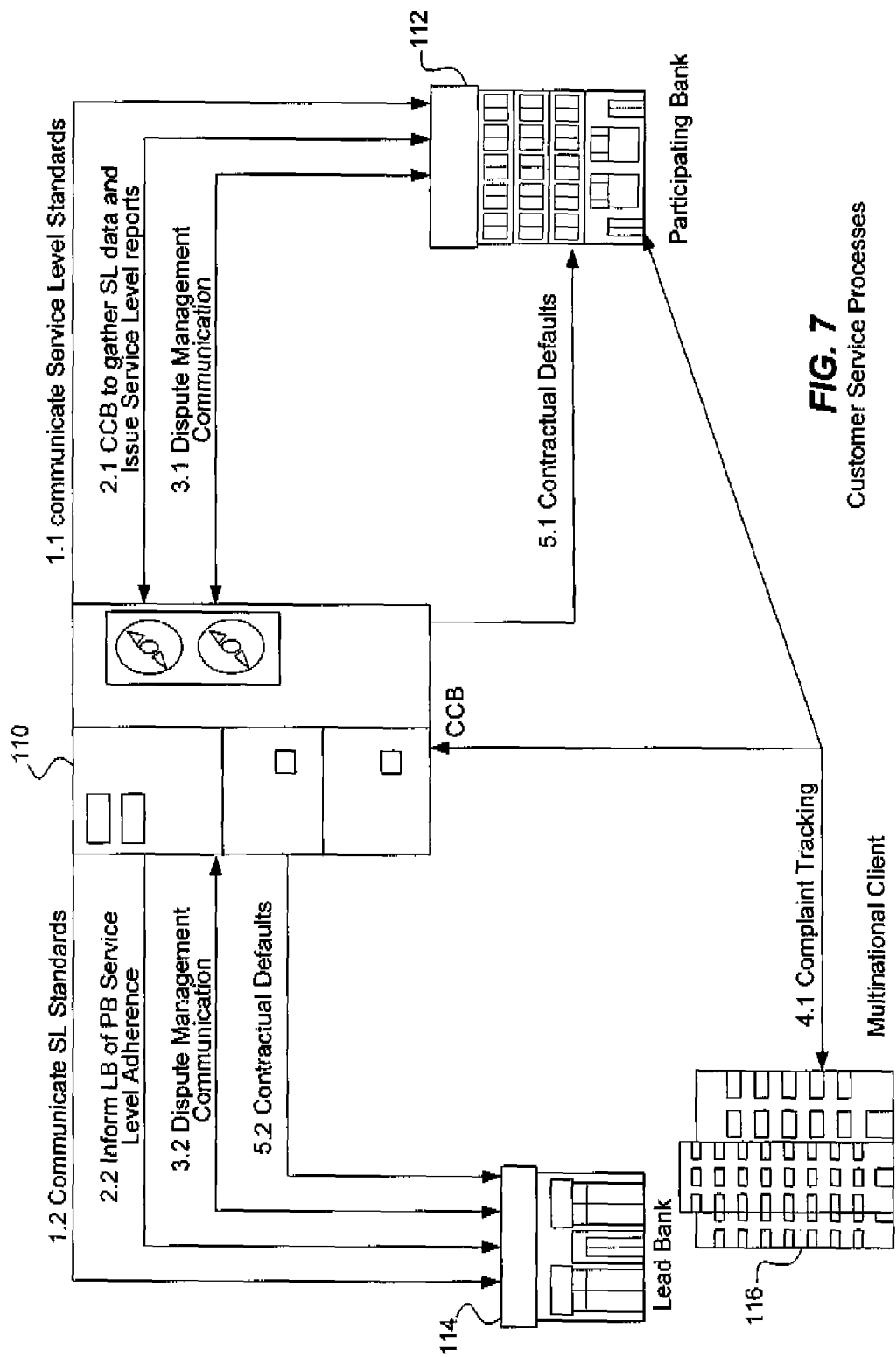
FIG. 7 illustrates processes associated with the customer service business function.

FIG. 7 illustrates processes associated with the customer service business function 154. The customer service business function is more than simply meeting the service level management parameters. Customer service monitors the banks to insures both the lead and participating banks uphold the terms and conditions set forth in their respective agreements. Should a bank violate a term of an agreement, appropriate action may be taken to remedy the situation. Action may involve legal action and/or ultimately the search for a replacement bank. Customer service also encompasses handling inquires on behalf of clients, as well as quickly and efficiently responding to and resolving any disputes.

Figure 8:
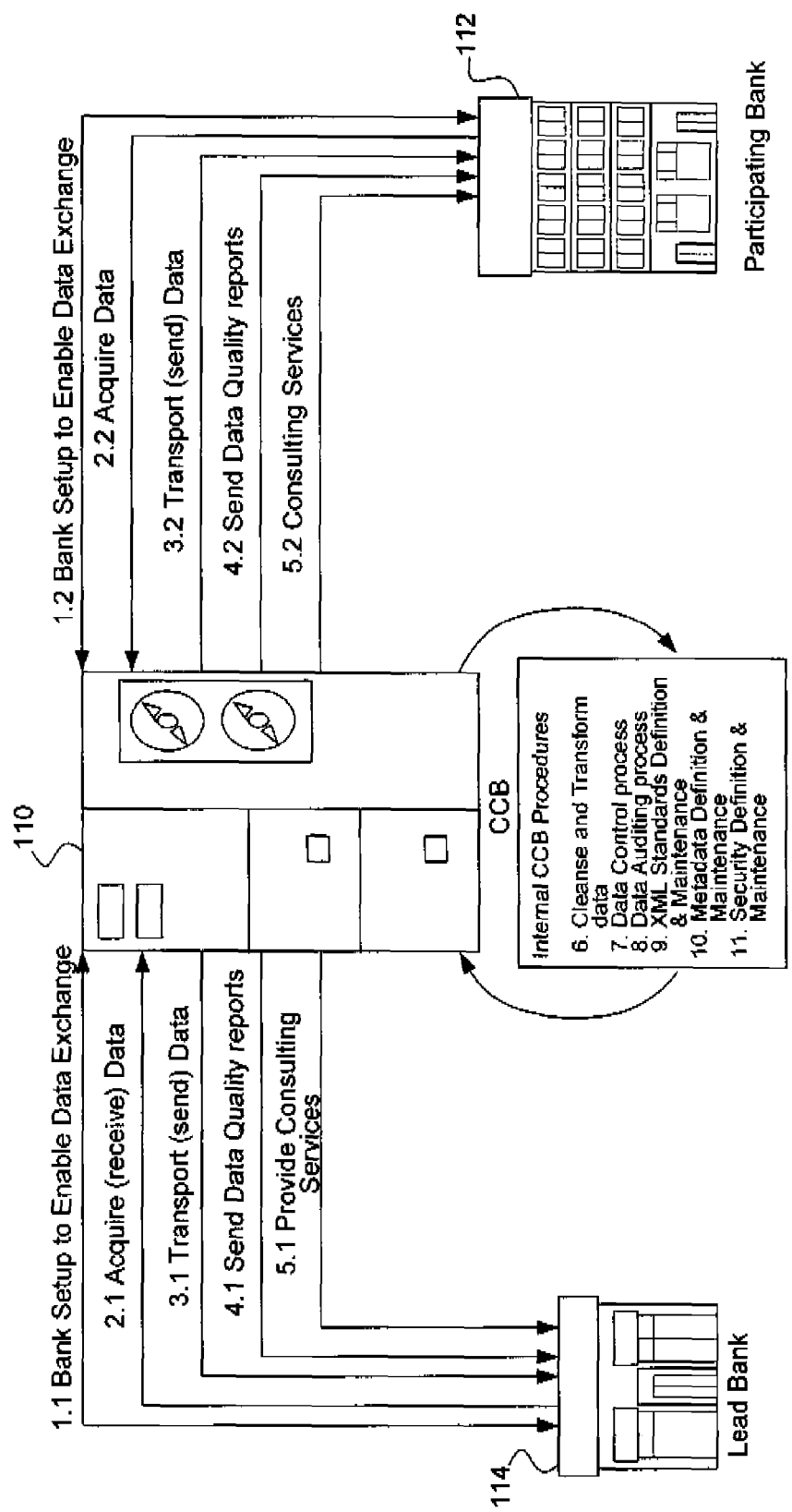
FIG. 8 illustrates processes associated with the data exchange services business function.

FIG. 8 illustrates processes associated with the data exchange services business function 155. Data exchange services involve acquiring, transporting, and storing data. CCB focuses primarily on transactional and cardholder data, although it can accommodate enriching these data with non-financial data if desirable. CCB also receives data from participating banks that is used to bill the lead banks for the services the participating banks provide. The transactional and cardholder data is provided by the participating banks to CCB. Preferably, CCB data exchange takes place using a "File Broker" system that receives files containing the transaction and cardholder data of the lead bank's clients from all participating banks. These data are consolidated and sorted by lead bank and by client and are stored in a CCB store. CCB can either forward or make available the collected data to the lead bank. Additional CCB data stores are used to collect data from the various issuing and processing platforms. These data stores are global, with accommodations made for local data privacy laws.

Figure 9:
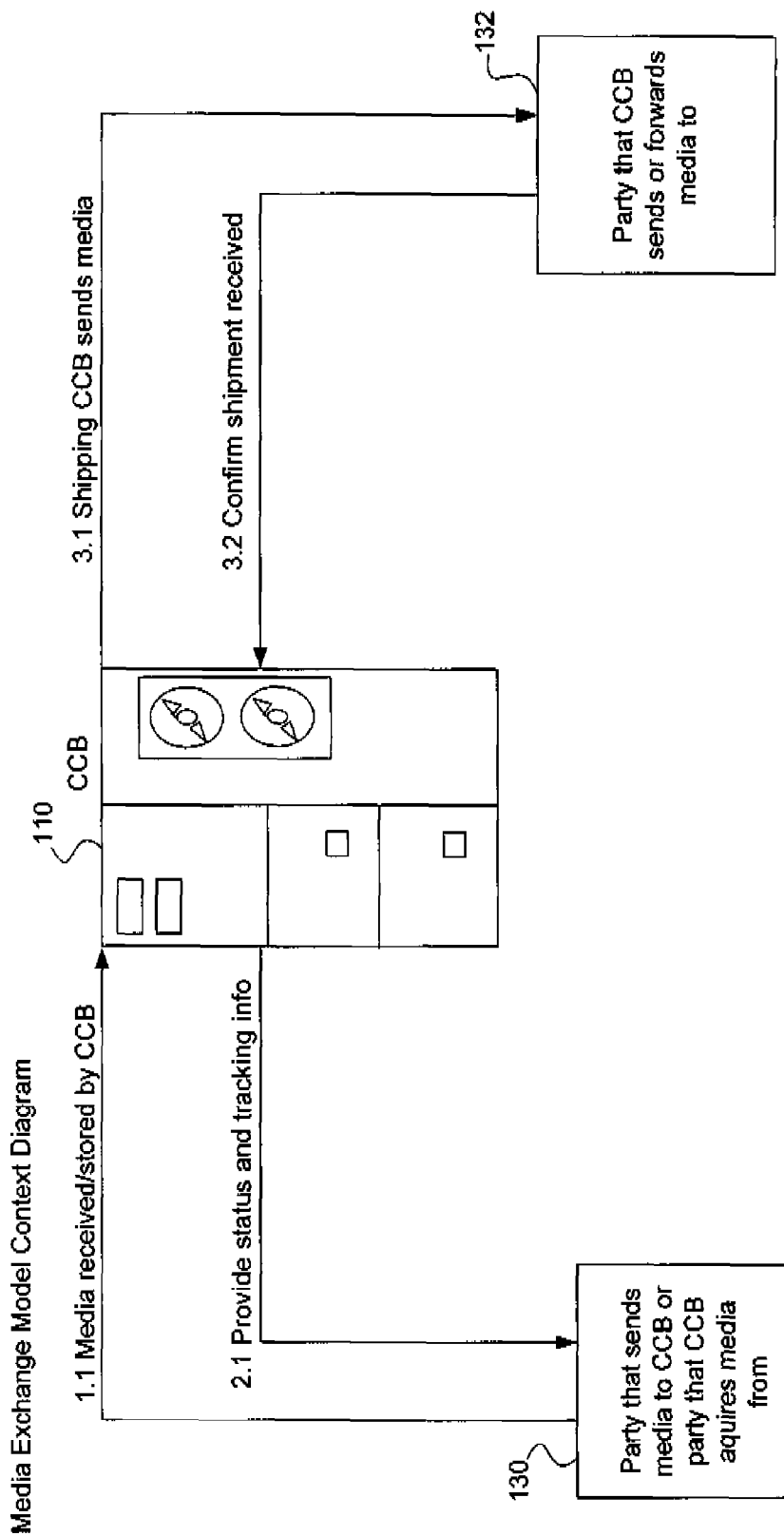
FIG. 9 illustrates processes associated with the media exchange business function.

FIG. 9 illustrates processes associated with the media exchange business function 156 to exchange media with parties such as parties 130 and 132. The media exchange business function involves the transfer of various types of media such as plastics, service agreements, collection policies, training materials, brochures, tapes and CDs, etc. Preferably, CCB receives, sends and forwards the various types of media to the lead and participating banks.

Figure 10:
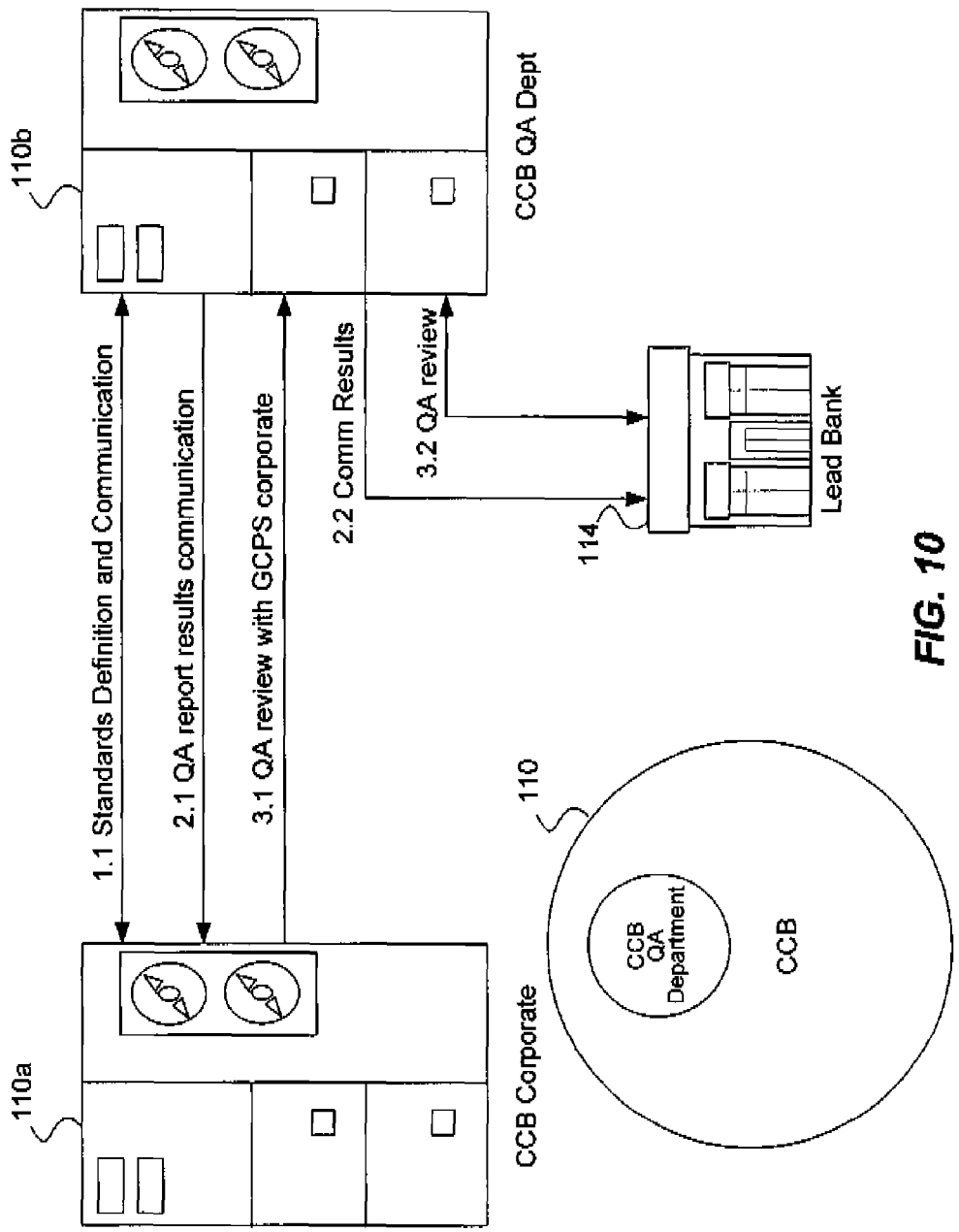
FIG. 10 illustrates the processes associated with the quality assurance business function.

FIG. 10 illustrates the processes associated with the quality assurance business function 157. Quality assurance is an internal process of the CCB QA Dept. 1106 which insures that CCB is meeting the standards which the lead banks expect. The QA Dept. 1106 communicates with CCB Corporate 110a. Quality assurance activities may include: standards maintenance (i.e., timely delivery of data and timely turn around on assisting a lead bank with bids); dispute resolution (i.e., measuring how quickly disputes are settled and resolved); and benchmarking (i.e., comparing country coverage, client satisfaction, market share, etc.).

Figure 11:
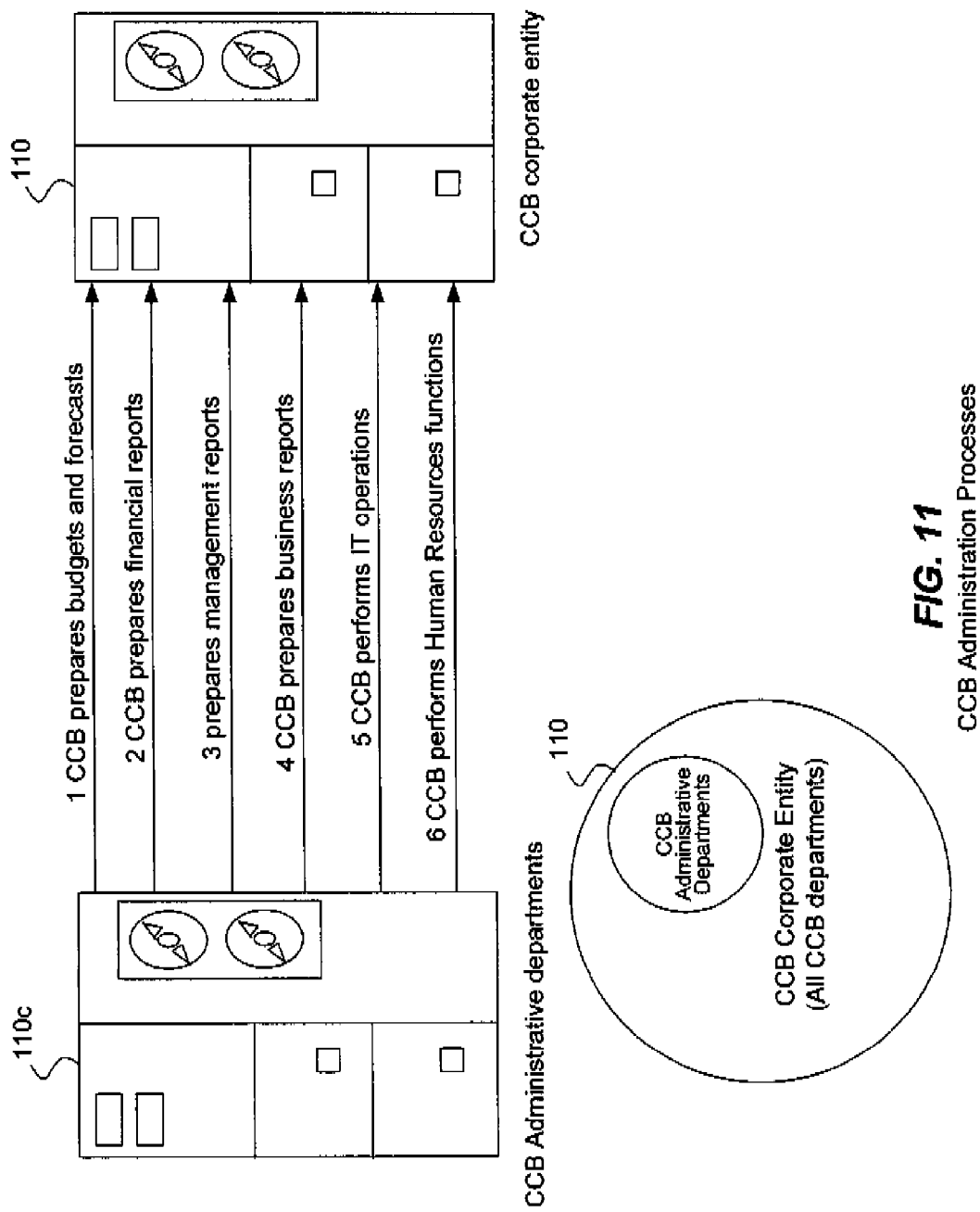
FIG. 11 illustrates processes associated with the CCB administration function.

FIG. 11 illustrates processes associated with the CCB administration function 158 carried out by CCB administrative departments 110c. CCB administration is responsible for the gathering and mining of data passed through CCB. The data is used for various types of reporting including budgeting and forecasting, business reporting and management reporting. IT operations is responsible for the initial setup of the CCB infrastructure structure as well as the data ETL. IT operations also include various maintenance functions, overseeing servers, networks, software and databases.

Agreements Between CCB and Lead and Participating Banks

As mentioned earlier, an important feature of the present invention is the ability of a lead bank to rely upon participating banks and CCB for the provision of services at a particular level and price. In turn, a participating bank will rely upon its lead bank and CCB for payment, and CCB will expect the lead and participating banks to perform certain tasks during the bid process and in servicing the needs of a client. A mechanism used to create such assurances that may be relied upon uses agreements between lead banks and CCB and agreements between participating banks and CCB. Because each bank need only enter into an agreement with CCB and not with each and every other bank with which it might do business, the logistics and complexity of providing a solution for a client are greatly reduced. Of course, a bank may perform as a lead bank in one situation and may act as a participating bank in another situation. It is also entirely possible that a bank may choose to only be a participating bank.

Creation of obligations between lead banks, participating banks and CCB may be performed in many different ways. For example, a bank may enter into a single agreement with CCB that defines the bank's role either as a lead bank or as a participating bank. Alternatively, there may be separate agreements depending upon whether the bank may operate as a lead bank or just as a participating bank. And although it is preferable to have each bank enter into an agreement with CCB, it is entirely possible that a lead bank might enter into a separate agreement with each of the foreign banks with whom it will service the client.

Because a lead bank wishes to prepare a bid document in response to an RFP from a client and to eventually enter into a contract with a client, the lead bank wishes to rely upon assurances from participating banks and CCB regarding the nature, level and price of services. For this reason, it is preferable that the agreements entered into by the banks are enforceable in some fashion. Enforceability may be guaranteed in different manners. By way of example, each agreement may be a legally binding contract that obligates a bank and/or CCB to perform certain actions. Or, enforceability may be guaranteed by providing incentives for banks to live up to an agreement, or by providing financial or other penalties should a bank not perform services it has agreed to. Alternatively, enforceability may be guaranteed by providing that a particular bank may be prohibited from participating in the CCB system should it not live up to its obligations. It is also contemplated that enforceability might be guaranteed through means other then a written agreement, for example, where certain services might be guaranteed in a particular country through an oral agreement. Other ways that such agreements might be enforced include loss of exclusivity of a given geographic area for participating bank services.

In a preferred embodiment of the invention, there is a written agreement entered into between a lead bank and CCB, and a second agreement entered into between a participating bank and CCB. It will be appreciated by those of skill in the art that such agreements may be worded in many different ways, and may have fewer or greater sections than described below. In addition, there may be a combination or series of agreements that take the place of those described.

Regarding the agreement between CCB and lead banks (the "lead bank agreement"), it may include terms setting out their respective roles in a typical commercial product multinational program. A definition section of the lead bank agreement would provide definitions for various of the terms used in the agreement, which could be defined various ways.

A services section would describe a menu of services upon which a lead bank will rely in preparing a bid document. This would include a discussion of the menu of services that not only apprise lead banks of the capabilities of participating banks and of CCB, but also provides assurances (through the enforceable agreement) that those services will be provided by a participating bank or by CCB. Preferably the menu of services lists the services provided by at least one participating bank in all available geographical areas, and also services provided by any possible service provider in a geographical area. There is a wide range of services that may be provided by participating banks. For example, participating bank services may include a list of service offerings, service features and options, client/cardholder servicing, underwriting protocols, client/cardholder fees and incentives, etc. This section may further describe the menu, including: participating bank services available in geographic areas; available participating banks in these areas; CCB services available in areas; the service levels applicable to the services available; any deviations from standard services; time period for availability of services; CCB pricing for its services; and other information needed by a lead bank to respond to a client RFP. Services may also include those shown in FIGS. 12 and 13 and further described below.

A managing section of the Lead Bank Agreement would discuss the role of CCB in managing the participating banks. This section would define what could be termed a "hub and spoke" arrangement, whereby CCB as the hub manages all participating banks on behalf of the lead banks. For example, should one particular bank be performing as a participating bank for three different lead banks in order to service three different clients, CCB would manage this participating bank; it would not be necessary for each lead bank to manage the participating bank. In this section the Lead Bank Agreement would describe how CCB determines the capabilities of the participating banks, advises the banks, monitors their performance in relation to service levels, enforces services levels, resolves service level problems, etc. It might provide that CCB may provide substitute services should a participating bank default. In addition, CCB may handle complaints from clients as well as resolving disputes between lead banks and participating banks. Similarly, pursuant to this section, CCB could manage several participating banks in different geographical locations providing services for one lead bank to one client's employees in these different locations. Through the implementation of these provisions of a Lead Bank Agreement, the system of the present invention realizes a economy of scale and uniform quality of services in addition to other features.

A CCB services section would describe services to be provided by CCB. In general, this section describes how CCB identifies reliable technologies for the development and operation of a global processing platform. Specifically, this section may describe how CCB would: operate an infrastructure to capture and consolidate the delivery of transactional and cardholder data for client and bank MIS reporting; develop servicing capabilities in areas where needed to supplement participating banks services; develop servicing capabilities in areas where needed to CCB and participating banks do not have presence to issue and maintain a commercial product program on behalf of lead banks, etc. This section may also describe how CCB may: report to lead banks on the quality of the services; conduct benchmark tests; enhance its infrastructure; brand the commercial product; etc.

A revenue section of the Lead Bank Agreement would discuss the revenue collection services that a participating bank could perform on behalf of a lead bank. In the course of preparing the bid document to respond to a client RFP, the lead bank first reviews the menu of services (described in more detail below) and the pricing for services that has been established independently by each participating bank. This review helps the lead bank determine its revenue requirements necessary to cover these services to be obtained from the local participating bank in a given geographical location. The menu of services will provide a posting of the service fees that the participating bank in the local geographical area will charge the lead bank for implementing the card program. These fees are the costs to implement the program and will be paid by the lead bank to the participating bank. Of course, even though these fees are posted on the menu of services, the two banks may further negotiate the fees. These service fees cover broadly all costs to the participating bank in implementing a local card program and include: the cost of funds (i.e., the float); the cost to issue cards; the cost to maintain cards, including documentation of local card issuance, card agreements with individual cardholders, disclosure documents, statements; customer service; marketing services; and the cost for implementing a reward points program. Any other costs that the program requires may also be posted.

As to revenue collection services, below is described a particular model for revenue collection that works well with the present invention and address numerous problems in the prior art. Of course, other revenue collection models are possible. Preferably, the menu of services will also describe sources of revenue that will be generated in a local geographical area or by a particular card program. These sources have been established independently of the lead and local participating banks, and include the local interchange reimbursement fees and the international interchange reimbursement fees (which are established by local and international card associations or by laws or regulations in areas where certain prices might be governmentally mandated).

These local participating bank service fees, IRF rates and other information pertinent to determining revenue requirements are all posted on the menu of services for the lead bank to review. Based upon information in the RFP or from other negotiation with the potential client, the lead bank will know other pertinent statistics for the relevant geographical areas and particular payment services such as number of cards to be issued, estimated sales volume per year, and expected usage patterns, such as (i) number, frequency and size of transactions, (ii) types of merchants or service providers from which goods and services will be purchased, (iii) cash (ATM) transactions, and (iv) the amount of international usage.

Thus, by reference to this information a lead bank can quickly calculate what its total costs and revenues will be from payment services provided to the client's employees located in a particular geographical area, including revenues generated by the lead bank's pricing to the client and those arising from the local areas established independently of the lead bank, participating bank and CCB.

Also included in the revenue collection model is the notion that a lead bank will be billed directly by each participating bank and will remit service fees to each participating bank in its own local currency. In this way, the lead bank will assume any local currency risks. CCB will also bill the lead bank directly for services that it performs; the lead bank will remit these fees directly to CCB. Alternatively, it is also possible for all participating banks to bill CCB for all of the services that the participating banks are providing to the lead bank. CCB would then total these fees, add in their own service fees, and then bill the bank the grand total in a single currency. When CCB receives the total fees from the lead bank, it would then remit to each participating bank their requested fees in their own local currency. This alternative would require CCB to take local currency risks and is not the preferred embodiment, although it is possible. In the latter case, CCB could charge a fee to the lead bank and/or participating banks to offset the resulting currency risks.

The lead bank thus knows what its total revenue will be for a geographical area and the total fees it must pay to the participating bank for implementing the program. The net of these two amounts is the profit for the lead bank in a particular geographical area. By performing these calculations for all areas for which a potential client has requested proposals, the lead bank can quickly determine what its total profit will be and it then is in a position to offer concessions to the client on a global basis. For example, a lead bank may choose to offer the client a particular global rebate rate, no card fees globally, or enhanced points accumulation opportunities.

While in the prior art many of these rebates or no card fees might be unacceptable to a local bank, the lead bank is now in a position to offer these concessions to a client on a global basis because of the particular menu of services model, including the revenue collection model herein described. As mentioned above, the profits that the lead bank realizes can be used to provide rebates or fee waivers for a client, and can also be used to cover any risk the lead bank may have.

For example, the present invention allows a lead bank to underwrite programs globally, which although entails more risk, is a feature that is desirable to potential clients. Consider that with typical corporate card programs either the corporation will be obligated to pay charges incurred by employees or the employee will be obligated to pay for their own charges— so called "personal liability." Usually a corporation wishes its employees to be obligated, while a local bank will typically wish to have the corporation be obligated for all charges. Should a local bank be particularly adamant in this view, it could prove difficult for the lead bank which is negotiating with a multi-national client.

Fortunately, the system of the present invention and the menu of services model provides a solution to this problem and allows global underwriting. In other words, a lead bank can underwrite a card program in a local area where the participating bank is averse to taking on the personal liability of individual cardholders so that the lead bank does not lose the client's business globally. Essentially, a local bank would agree to issue cards to the client with personal liability, in return, the local bank may increase its service fees to the lead bank in order to cover its administrative costs and greater risk and/or the lead bank may agree to reimburse the local participating bank for losses that arise from this individual liability arrangement. In this fashion the lead bank can provide the client a global individual liability program while utilizing the local services of participating banks that ordinarily would not issue cards on such a basis.

A bid section of the lead bank agreement would discuss a procedure by which a lead bank can quickly and with confidence prepare a bid for a client; FIG. 14 provides more detail. Typically, an RFP from a client has very detailed questions regarding customer service in various countries and many other questions regarding local areas. In the past, it has been proven extremely difficult for a sales person at a lead bank to attempt to respond to such an RFP because such detailed local knowledge is very difficult to come by. The bid process described supports a sales effort by a lead bank, insures that a client deals with a single point of contact, and results in a single global contract between the lead bank and the client.

This bid section of the agreement may be written in many different ways depending upon the exact nature of the interactions between the parties desired. By way of example, the bid section may include the following clauses:

1. Support for Client Bids. CCB would facilitate a Lead Bank's bid for a Client's Commercial Product Multinational Program through the following process:
    1.1. The Lead Bank would bid for the provision of Commercial Product Multinational Programs, including services of its choice from the Menu effective at the time when the Commercial Product Multinational Program would be in effect with the Client. The Lead Bank would prepare a proposal in response to a Client's RFP. The response would include all relevant terms associated with the Lead Bank's offer to service the potential multinational corporate Client.
    1.2. In support of its proposal, the Lead Bank would submit a Bid Document to CCB. Within five (5) business days, CCB would confirm that the Menu items are correct. In jurisdictions where there is more than one Participating Bank, the Lead Bank may select which Participating Bank it or its potential Client would wish to select.

1.3. Where the Client is requesting items which are outside the Services listed in the Menu, CCB would notify the Lead Bank of this fact when it provides confirmation and would, within fifteen (15) business days, notify the Lead Bank of whether such non-standard services could be made available, and in the event such non-standard services are available, CCB would provide information including service descriptions, Service Levels, dates of expected availability and pricing for such non-standard services.

1.4. Where a Participating Bank does not exist in a Territory requested by the potential Client, CCB would attempt to recruit a suitable financial institution (as suggested by the Lead Bank, if possible) to become a Participating Bank and will keep the Lead Bank informed as to its progress. When a Participating Bank has been identified, details of its PB Services will be forwarded to the Lead Bank by CCB.

1.5. In the event that a Participating Bank cannot be identified within a reasonable period of time, CCB will evaluate other possible means of delivering the Commercial Product Multinational Program to the Client's Affiliate in its country (for example by means of cross-border issuance of Commercial Products). The Lead Bank may be asked to pay for all investments and costs associated with providing infrastructure and Services in these markets. The Lead Bank will be made aware of the reimbursable costs prior to spending and will be asked, in writing, for approvals. If CCB wants to use such facilities, Lead Bank would be compensated for such additional use.

1.6. The Lead Bank will prepare, using information supplied to it by CCB, and, if relevant, any Participating Bank, its final Bid Document and provide a copy of the Bid Document to CCB.

1.7. CCB will confirm receipt of the final Bid Document by facsimile or email transmission within twenty-four (24) hours of receipt. The Lead Bank will use all reasonable means to answer any inquiries regarding the final Bid Document that CCB may reasonably raise to ensure the Lead Bank has correctly interpreted the Participating Bank's PB Services.

1.8. CCB, within five (5) business days of receipt of the final Bid Document would confirm its acceptance, of the final Bid Document. CCB would takes no responsibility for the availability or accuracy of Service descriptions, Service Levels or pricing of Services except upon its written acceptance of a final Bid Document.

1.9. If, following the submission of a final Bid Document, the potential Client requests a variation or enhancement of the Services described in the final Bid Document, the Lead Bank would notify CCB. CCB would then use reasonable efforts to provide a prompt and timely response to any such requests within fifteen (15) business days.

1.10. If the potential Client selects the Lead Bank, then the contents of the relevant final Bid Document that had been accepted by CCB would be incorporated into a Program Addendum entered into by CCB and the Lead Bank.

1.11. The Lead Bank's pricing, services other than Services, and other terms and conditions, would be determined solely by each Lead Bank independently and would not be disclosed to CCB.

More specifically, the bid process described allows a lead bank to confirm the availability of local services via the menu of services, and also allows a lead bank to ascertain the availability of services not in the menu and to negotiate for them if desired. In the process described, the lead bank works through CCB in order to ascertain the available services and their costs; CCB works to gather available information from the participating banks and to disseminate the critical bid documents and agreements. In this fashion, the "hub and spoke" approach again is used to assist the lead bank with finalizing an agreement with the client. It is thus not necessary for the lead bank to contact and negotiate and obtain an agreement with each and every participating bank in the local markets desired. Though, the model described does not preclude a lead bank from negotiating and entering into contracts with participating banks for the same services, if desired.

Another section of the lead bank agreement would discuss how CCB would provide and confirm an implementation plan for the card program and how a global relationship manager will be appointed for each client. Preferably, this manager is employed by CCB and provides a single point of contact for the client and insures that the card program is implemented as previously agreed to.

Another section would discuss obligations of the lead bank regarding extra services, financial data, credit risk parameters, risk of credit losses, meetings with relationship manager, sharing of statistics, keeping a complaint log, Another section would discuss the fees payable to CCB by the lead bank.

Regarding the agreement between CCB and each participating bank (the "participating bank agreement"), essentially this agreement is the reciprocal agreement to the lead bank agreement. For example, where the lead bank agreement might set out expectations for a lead bank from a participating bank, this participating bank agreement specifically obligates the participating bank to perform that particular task. Thus, performance related to products, services, fees, revenue collection, minimum service levels, etc., are preferably specified in this participating bank agreement in order to legally obligate the participating bank. Examples of sections of this agreement are described below.

A menu of services section obligates the participating bank to provide a description of its services to CCB which in turn are provided to lead banks. This section also discusses the participating bank services, services levels, and pricing for services. A coordination section discusses coordination of the participating bank services with CCB including monitoring by CCB, improvement of services, substitute services, a complaint procedure, reporting, bench marking, etc. In this fashion, a "hub and spoke" model is implemented by which CCB is responsible for coordinating with each participating bank and a lead bank need not coordinate with each participating bank it utilizes.

A revenue section discusses how all revenue from a card program will be payable directly to the lead bank. Thus, not only can a lead bank more easily calculate its total revenue from a global card program, but also it is assured receipt of this revenue via this participating bank agreement. A section for service level fee adjustments provides that the service fees paid by the lead bank to a participating bank may be reduced based upon the quality of service delivered by the participating bank. A credit risk section discusses how a lead bank would reimburse a participating bank for credit losses, and how such reporting and collections are facilitated through CCB. A dispute resolution section discusses how CCB would facilitate resolving a dispute between a lead bank and participating bank. An audit section provides that CCB may conduct an audit of a participating bank upon request of the lead bank. Thus, CCB further facilitates the "hub and spoke" model.

A bid section discusses the support for a client bid that will be provided by a participating bank and CCB (further discussed in FIG. 14). A participating bank obligation section lays out the specific obligations of the participating bank in order that a multi-national card program may be implemented successfully. Various subsections relating to security, review meetings, management of data, a complaint log, cardholder agreements, etc., all reflect the model that management of the participating banks will be handled by CCB on behalf of the lead bank.

Sections of the lead bank agreement and sections of the participating bank agreement may discuss any of a number of other issues relevant between a bank and an entity such as CCB in the context of a complex financial agreement. These sections may include issues such as commencement and term, termination, confidentiality, indemnification, representations, warranties, disclaimers, insurance, limitation of liability, tax liability, assignment, governing law, dispute resolution, etc. Those of skill in the art will realize that some of these clauses are optional, others may be added, and they may be written in many different forms depending upon the risk each party chooses to take and the negotiating power of each party. One of skill will also be aware of the appropriate language to use in each section so we will not discuss in detail here.

Thus, it has been shown that use of the lead bank and participating bank agreements facilitate implementation of a "hub and spoke" model by which CCB manages the participating banks. The agreements also require use of a menu of services and particular service levels which allow the lead bank to know exactly what is available in local markets, provide a clear bid process by which the lead bank may respond in confidence to a client RFP as quickly as possible, and in general provide assurances that the parties may be relied upon to assist with the bid process and to implement the card program required by a multi-national client.

Menu of Services

The menu of services published by CCB preferably is based upon a minimum level of services that participating banks will provide to lead banks as part of multi-national card program. As described earlier, the actual implementation of a menu of services and the medium by which is it presented may take a wide variety of forms. This section illustrates one possible format for a menu of services, a possible list of services, and possible minimum service levels. These sets of services are preferably used by a lead bank when setting up a new corporate or purchasing card program for a multi-national client. The menu of services allows a lead bank to research, by process and feature, which options are available by country, and to evaluate whether to offer its client the minimum standard or something greater then the minimum standard. In the preferred embodiment, the menu of services is a dynamic set of services, features and associated service levels, which is updated as capabilities of participating banks change, new participating banks are added or participating banks are deleted, and geographical areas where services are available change. The menu of services may be published through any media, while the preferred embodiment would be instantaneously updateable and constantly accessible, such as through an online process. The dynamic embodiment provides lead banks added flexibility to meet rapidly changing competitive conditions.

FIGS. 12A-12D show one possible format for organizing and publishing services, features and associated respective minimum levels of service that could be made available in connection with a travel and entertainment corporate card. Similarly, FIGS. 13A-13D illustrate one possible option for a feature set and minimum levels of services for a purchasing card. Processes 180 of each figure are the processes associated with implementation of a particular type of card program. Service levels 182 are the parameters within which the particular service is to be delivered and is a measure of quality in comparison to which the participating bank's performance of the service will be evaluated in determining whether it has met its obligations under the participating bank agreement. Thus the menu of services serves as a primary tool for controlling quality of services across service providers and geographical areas. It is not necessary or appropriate however for every process or feature to have a specific service level. Lead banks and participating banks also may separately negotiate alternative service levels and possibly associated pricing differentials where desired.

Features 184 are possible features for each process, along with possible minimum levels of services, labeled "options" 186. FIGS. 12 and 13 list possible minimum levels of service ("options") that may be required to be provided by participating banks. These processes, service levels, features and options are used to insure that multi-national clients are supported in each country with a minimum level of product service and support.

The options shown for particular features would ideally list all of the minimum service levels options that might be offered to a client by the lead bank and required of the participating bank given the capabilities of participating banks at a certain time. For example, CCB (perhaps with input from its lead bank customers) may decide to use one of the particular options as the required minimum level of service, may choose a few of the options, or may require that all options shown in a given category are required minimum levels of service. Once these minimum levels of service are chosen, CCB may decide how to enforce that these services are provided. For example, CCB may deny participation by any participating bank that does not meet the required minimum level of service upon entry into the program. Ongoing compliance could be enforced by a schedule of service fee adjustments that would affect the compensation paid to the participating bank depending on the degree and/or frequency of compliance shortfalls compared to the service level standards. Alternatively, CCB may allow a participating bank to participate even though it falls short of some of the required levels of service, but may require that bank to implement the required service within a particular time frame. CCB may even choose to insist that a bank meet a particular level of service, but may choose not to enforce that particular requirement. These options facilitate flexibility in tailoring available capabilities to local and global competitive conditions.

It is contemplated that each bank will make available to CCB information such as is shown in FIGS. 12 and 13 (assuming that both corporate card and purchasing cards are available) which lists the service levels, features and minimum levels of service that a particular bank will provide in a particular country. Of course, the information may be provided in a wide variety of formats. As mentioned above, it is preferable if a given bank offers the required minimum levels of service as determined by CCB, and each menu of services provided by a particular bank may in fact provide greater than the required minimum.

Bid Assembly Process

Figure 14A:
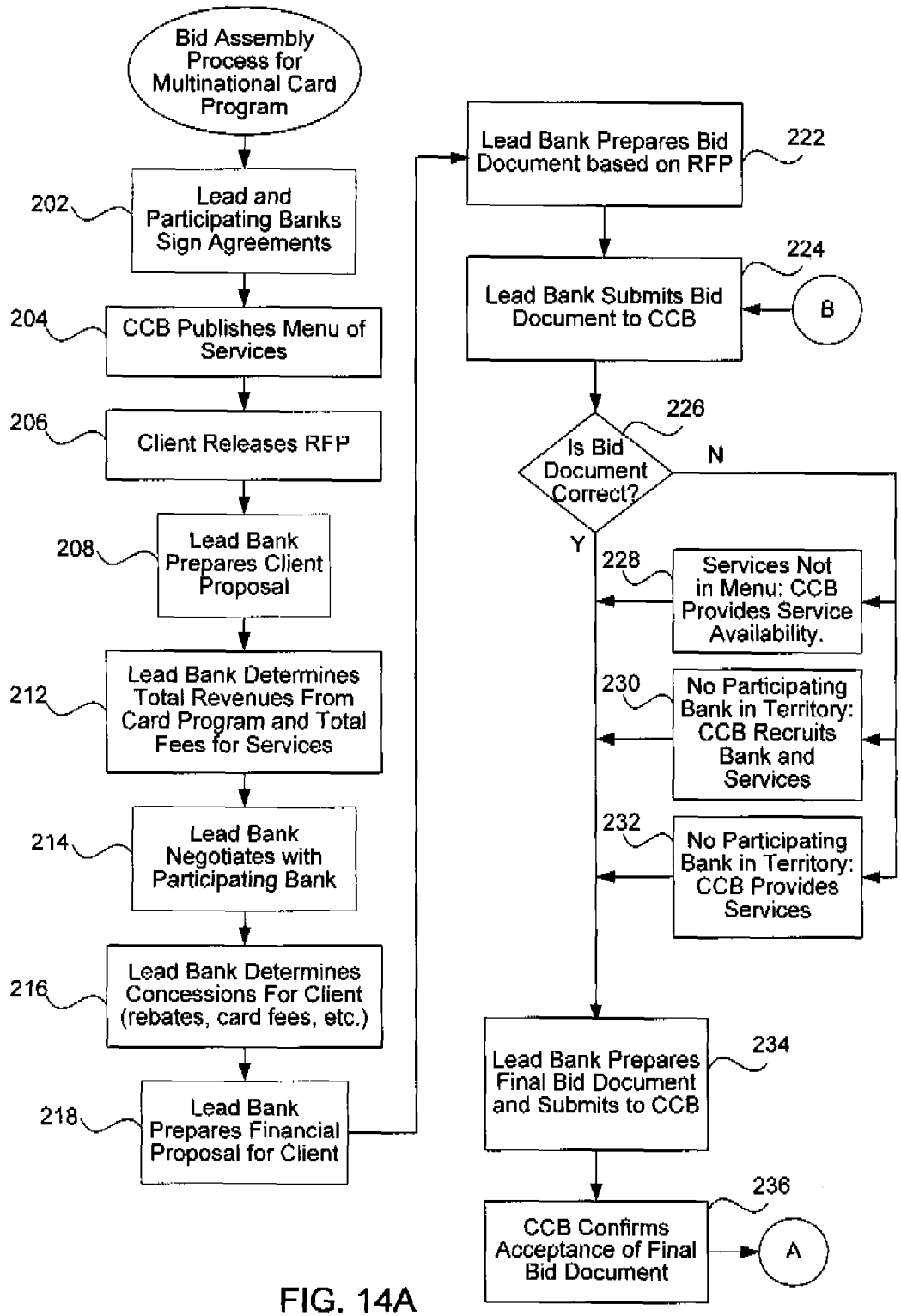
FIGS. 14A and 14B are a flow chart describing one embodiment of a bid process for a multi-national card program.
Figure 14B:
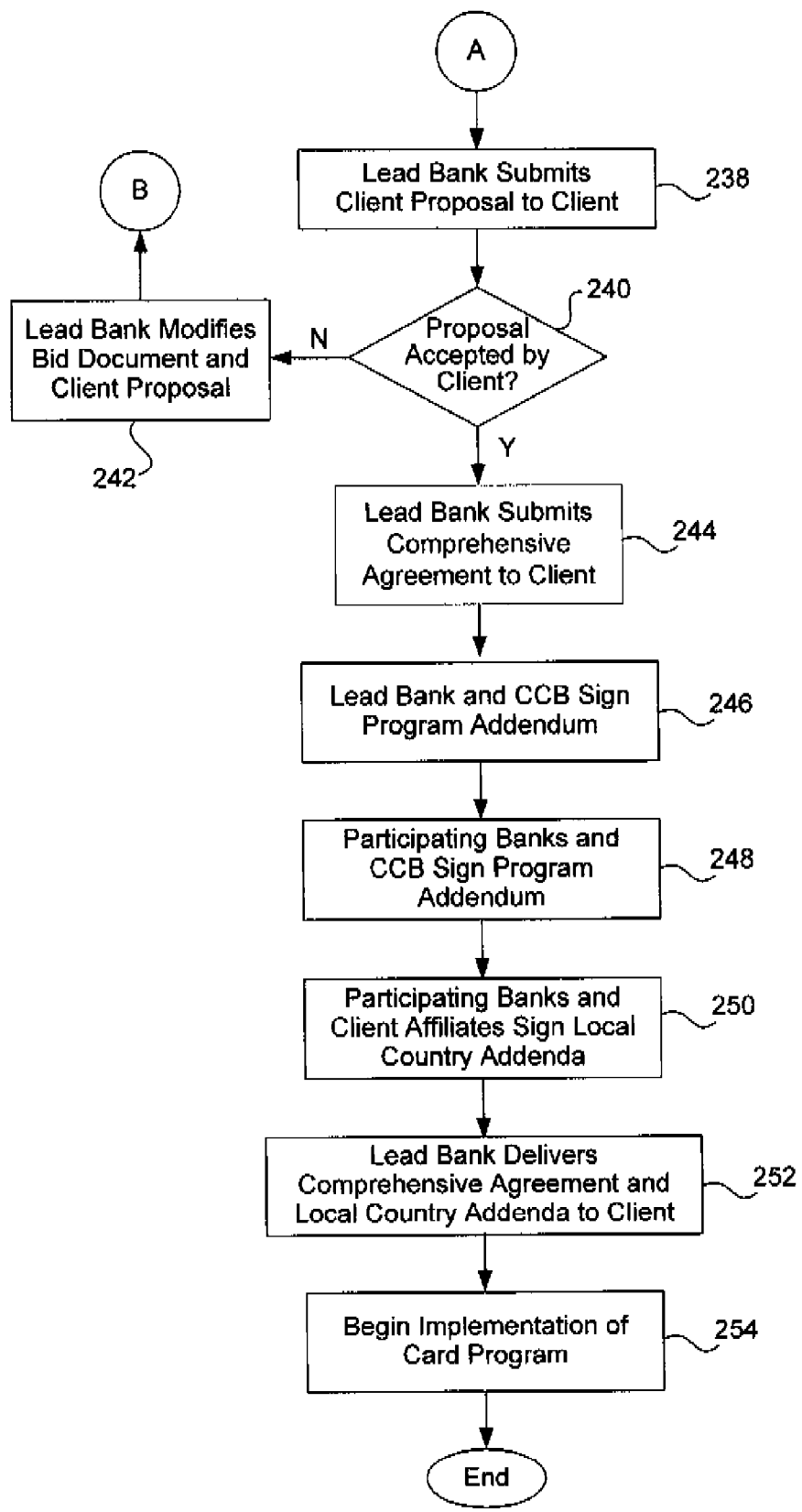

FIGS. 14A and 14B are a flow chart describing one embodiment of a bid process for a multi-national card program. It should be appreciated that the flow chart and lead bank agreement describe one possible process for submitting a proposal to a client and for finalizing that proposal; other steps may be added and/or steps may be performed in a different order.

In step 202 the lead bank and participating banks sign agreements with CCB as has been previously discussed. At this point in time, the lead and participating banks have agreed to a formal bid process, the participating banks have agreed to provide services available in a menu of services and associated service levels, and lead and participating banks have agreed to other terms in the agreements.

In step 204 CCB publishes the menu of services. As previously described, this menu includes information from participating banks or service providers in a particular country. Preferably, CCB polls participating banks to gather such information. In one embodiment, CCB provides a template or a list of requested information such as is shown in FIGS. 12 and 13. Preferably, CCB gathers all of this information from the various participating banks and puts it into a standard format that may be easily distributed to potential lead banks.

The other information that CCB provides for the menu of services are the current interchange fees related to a merchant transaction, and foreign exchange rates or ranges for MIS purposes. CCB may provide various other types of information as CCB (possibly in consultation with lead bank customers) identifies types of data that would be suitable for central gathering and dissemination. CCB will update this information as needed, while information coming from a service provider is preferably updated by the service provider when the information changes.

The menu may be published and/or distributed to lead banks in a wide variety of manners. By way of example, the menu is web based and is available to a lead bank by using a private network. Thus, a lead bank may browse the menu of services and gather the information that it needs. It is also possible that the menu is Internet based, with appropriate passwords and security in place so that only potential lead banks may view the menu. In another embodiment, the menu is available in electronic form at CCB but is not accessible from outside. An individual at CCB would then field questions from lead banks and provide information regarding the menu via electronic mail, file transfer, facsimile, mail, telephone, etc. In yet another embodiment, the gathered information takes the form of a library at CCB which includes brochures, price sheets, booklets and other paper-based information that are also available for review by an individual at CCB. Again, this individual would respond to inquiries from lead banks and provide the needed information.

At some point in time a client will release 206 a request for proposal (RFP) which requires a global solution to a commercial card program desired by the client. This RFP is usually sent to a lead bank, but may also be sent to a participating bank, or might be routed to CCB which would then send the RFP to all lead banks. The RFP may take any form and be released in any manner as deemed appropriate by the client.

Based upon the menu of services, in step 208 the lead bank might, but is not required to, prepare a preliminary proposal and provide it to the client. The proposal at this point is preliminary in that it describes which services the bank can provide to the client to meet its needs but may not necessarily include pricing for these services. If the services are not acceptable by the client at step 208, then a negotiation may ensue or the proposal may go through numerous iterations before the client accepts this proposal.

If a preliminary proposal is accepted, or if the lead bank chooses to skip step 208, in step 212 the lead bank begins to prepare a more detailed proposal including financial terms by determining its total revenues expected from the card program and also determining the total fees for services it must pay to participating banks, service providers and CCB. One possible technique for determining these revenues and fees has been described above in the Agreements section. In step 214 the lead bank may choose to negotiate directly with any participating bank over the availability of services and fees for those services. The lead bank may contact the participating bank directly to negotiate pricing, although if the fees and services shown in the menu of services are acceptable, it is also possible that there would be no negotiation.

Once the lead bank has determined total revenues, total fees, and a reasonable profit for itself, it is then able to determine possible concessions 216 for the client such as rebates, card fees and others that are proprietary to the lead bank, including but not limited to other services of the bank.

Once determined, in step 218, the lead bank is then able to prepare a detailed financial proposal containing possible concessions for the client. In step 218 if this proposal is not acceptable, the lead bank and client may further negotiate these terms. If accepted, the lead bank in step 222 then prepares a bid document based upon the original RFP and any modifications requested by the client. The bid document is prepared for CCB's use in confirming the availability of services, fees and ultimately to serve as a guide to implementation if the lead bank wins the bid. The bid document may list explicitly the fees to be paid to participating banks, may implicitly include these fees by reference to the menu of services, or may leave these fee amounts blank in the bid document. It is not necessary that CCB by aware of the fees negotiated between a lead bank and a participating bank. Even if CCB becomes aware of these fees, it is under an obligation not to reveal these fees. The bid document is preferably prepared in electronic form in a well known format, although it could take any electronic form and may also be prepared on paper.

As part of step 218, it is also contemplated that a client may have input into the selection of a participating bank in a particular region. For example, if a client presents a proposal to a client listing particular services to be provided by a particular bank in a country, the client may choose to negotiate over which particular bank in that country will provide the services.

In step 224 the lead bank submits the bid document to CCB using any suitable means such as by electronic mail, facsimile, mail, or even over the Internet or an Intranet. In step 226 CCB determines whether the bid document is correct. This step may be performed in different ways. In a first embodiment, CCB checks the bid document against the menu of services to insure that all services promised are available. In this embodiment, the bid document is not forwarded to participating banks. In a second embodiment, CCB will break out that portion of the bid document that pertains to a particular participating bank and forward such section to each participating bank. The participating bank is then able to check that portion of the bid document for accuracy. As the participating bank had already agreed to provide the services it has listed in the menu of services, its actions at this point are limited to reviewing the accuracy of the bid document. In this embodiment, the participating bank has agreed to provide the services in the menu because the lead bank has agreed to assume the credit risk for the multi-national card program or for other reasons. Optionally, it is contemplated that when a participating bank has reviewed its portion of the bid document, it may submit a confirmation to CCB that it will perform the specified participating bank services.

In a third embodiment, it is also possible that a lead bank had decided not to assume the credit risk of the program in which case a participating bank is taking on more risk. In this situation the lead bank agreement and the participating bank agreement can be modified to reflect which bank is accepting the risk. In this situation, the participating bank may decide whether or not it wishes to provide particular services to a client, or whether it wishes to provide a level of service to a client. Because the participating bank is assuming more risk, it will have the opportunity at this point to decline to provide a service or level of service for a client or to negotiate other terms and conditions that relate to the risks to be assumed by the participating bank. Examples of such terms and conditions might include spending limits, client employee limits or qualifications, escrow deposits or parent company guarantees.

There may be any number of reasons why the bid document is not correct. Various of these reasons are shown. For example, in step 228 if a client has requested an item not in the menu of services, CCB may make an effort to provide such non-standard services. Preferably, CCB notifies the lead bank about whether such services could be made available, the service levels, availability and pricing. In step 230 if it is determined that there is no participating bank in a territory requested by the client, CCB may attempt to recruit a financial institution to become a participating bank. If successful, details of the services available from this bank are made available to the lead bank. In step 232 if no participating bank can be found, CCB may evaluate other means of delivering services required by the client in that country. For example, CCB may consider cross-border issuance of a commercial card product. The lead bank may be asked to pay for such investments and costs associated with providing infrastructure and services in the pertinent geographical area. If modifications are necessary in any of these steps and changes to the bid document are suggested, it is contemplated that control would revert to step 218 in which the client has an opportunity to review the complete proposal including all financial details. Further negotiations may occur that this point and eventually the bid document would be prepared and checked again as in steps 222-232.

Once a bid document has been deemed corrected, in step 234 the lead bank prepares a final bid document and submits it to CCB. As mentioned earlier, preparation of this final bid document may involve further negotiation with either a participating bank or the client. If major changes are made, the bid document may be reviewed again as per step 224. Once the final bid document has been accepted, in step 236 CCB confirms acceptances of the final bid document. CCB is able to confirm that such services will be provided based upon commitments made by the participating banks in the menu of services. At this point, the lead bank has a firm commitment that such services can reasonably be provided at the prices desired.

In step 238 the lead bank submits the final client proposal to the client. Even at this stage further negotiations may occur and the client may or may not accept the final proposal (step 240). If not accepted, in step 242 the lead bank may modify the bid document once again and the client proposal. Control then returns to step 224 where the bid document is again submitted to CCB for review. Once the final proposal has been accepted by the client in step 244 the lead bank prepares a formal comprehensive agreement and presents it to the client and it is signed by both parties. A "comprehensive agreement" means an agreement between the lead bank and the central contracting entity of the client organization covering all of the services in all of the geographical areas to be provided by the lead bank. At this point a binding agreement has been formed between the lead bank and the client, and the lead bank has the assurance it can provide the services needed based upon reliance on the menu of services and/or CCB's confirmation of the bid document in step 236.

Once the lead bank's comprehensive agreement with the client has been signed, other tasks more ministerial in nature may be performed with the preferred steps as follows. In step 246 the lead bank and CCB sign a program addendum which becomes part of the lead bank agreement. This program addendum may include provisions such as: CCB formally informs service providers of services that are required; CCB provides an implementation plan and a milestone schedule for the card program; and CCB appoints a global relationship manager for each client.

In step 248 each participating bank and CCB sign a program addendum which becomes part of the participating bank agreement. This program addendum may specifically point out the services to be provided, their pricing and the term. In step 250 each participating bank and the local client affiliate of the client in that country sign a local country addendum. Although such an addendum may not be required in every jurisdiction, it is preferable that a local entity of the client sign an agreement recognized under the law of the local jurisdiction with the participating bank in that country. This may be done to ensure enforceability, to facilitate compliance with local laws or for other reasons.

In step 252 the lead bank assembles the comprehensive agreement with the client which has been previously been signed by the client (and each local country addenda which has been signed) and delivers the entire package to the client. In step 254 the lead bank, CCB and participating banks begin implementation of the multi-national card program desired by the client.

General Hardware and Software Embodiment of the Invention

In this section, certain terms are used differently than in the preceding sections. For example, a "transaction" in the preceding section means a purchase by a client's employee from a vendor or "merchant" using a payment card or a cash disbursement by a bank (e.g., through an ATM machine) to a client employee using a payment card. In this section, a "transaction" is used in the data processing sense, and refers to any discrete set of data that is communicated from sender to the intended recipient. Also, "participant" in this section refers to any entity that is sending or receiving data directly or indirectly on behalf of the lead banks, CCB and participating banks and could include CCB, the lead banks, participating banks and any number of data processing contractors for any of them.

The hardware and software embodiments described in this section are one possible implementation of the system. The invention as described herein may be implemented in other hardware and software embodiments, as will be appreciated by those of skill in the art.

Figure 15:
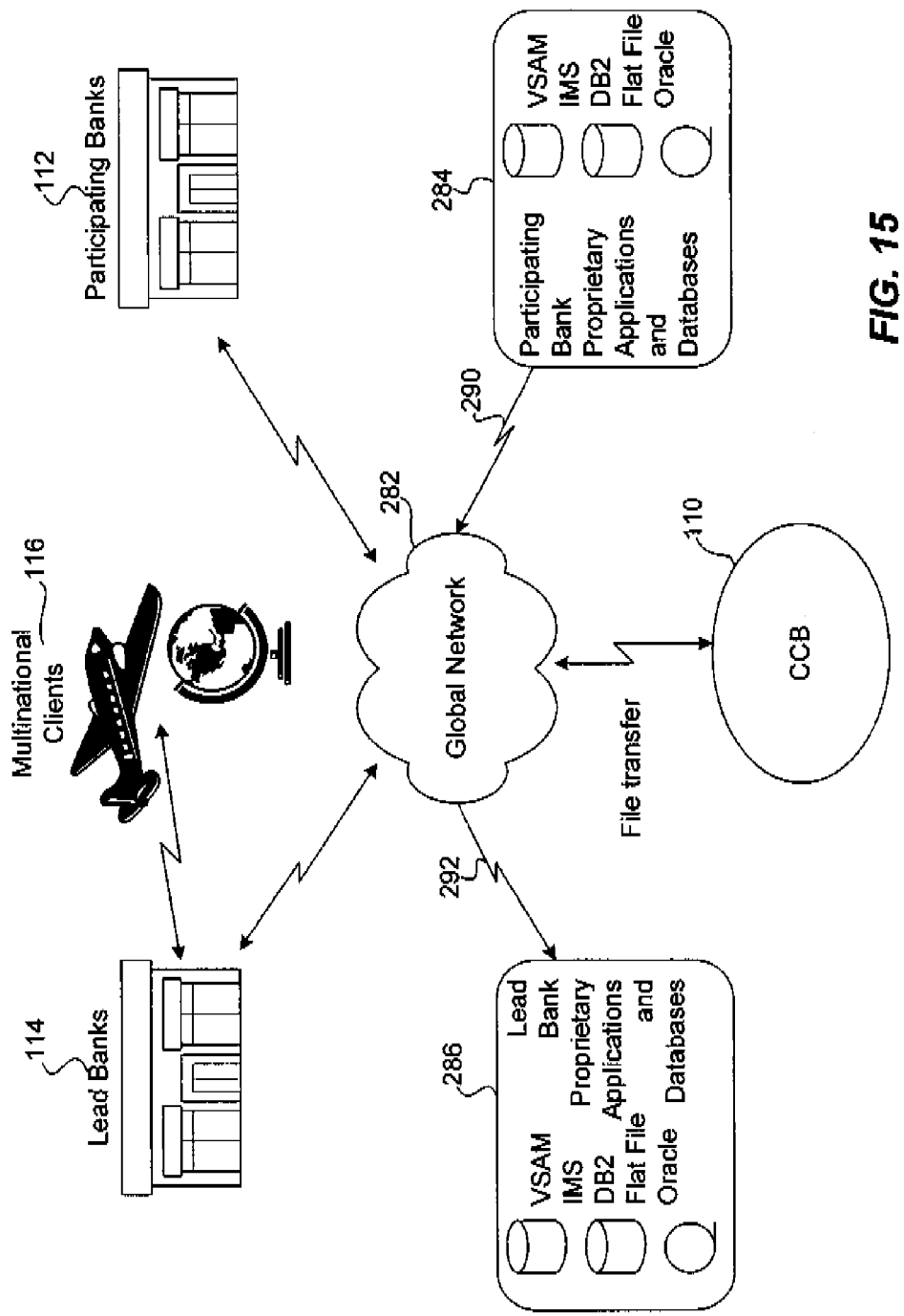
FIG. 15 illustrates one embodiment for a technical architecture of the data exchange platform used by the present invention.

FIG. 15 illustrates one embodiment for a technical architecture of the data exchange platform used by the present invention. As previously described, the banks and CCB communicate via any suitable global network 282. CCB includes a number of business functions, the data exchange function 155 will now be briefly described. In addition to the previously discussed communication links between the banks and CCB, a participating bank will also send data to CCB over a link 290. This data includes transactional data, operational data and enhanced data. Transactional data refers to data elements describing specific purchase or cash disbursement transactions, such as date, merchant name, merchant location, merchant category code, amount, etc. Operational data refers to administrative and customer service data, such as addition and deletion of cardholders, revoked cards, replacement cards, changes to spending limits, total spending during a period of time, etc. Enhanced data refers to details of certain types of purchases, such as itinerary data for airfare purchases or food, beverage, telephone and room rent and other folio data for accommodations.

As shown in FIG. 15, a participating bank includes any number of proprietary applications and databases 284, some of the more familiar names being shown. It will be appreciated by one of skill in the art that a bank may use any suitable database and/or file format and is not limited to those examples shown in the figure. Such data is sent from the participating bank to CCB which assembles all data from a variety of participating banks, and then segregates the data by client. Preferably, CCB will transform the data into its own internal data format. The data format used by CCB could be a proprietary format, or a known standard such as XML, INFOSPAN or ASCII II.

The internal format used could also be a customized version of a known standard. In a preferred embodiment of the invention, a modified version of the standard INFOSPAN is used. Thus, all of the transaction data for a particular client can be assembled by CCB. Additionally, CCB may perform aggregation services as part of a global MIS effort and can provide custom reports for a lead bank based upon its needs. Once processed, the data is transferred over a link 292 to the lead bank which may have its own proprietary applications and databases 286. In most cases, the lead bank may translate the data into its own internal format if necessary.

Figure 16:
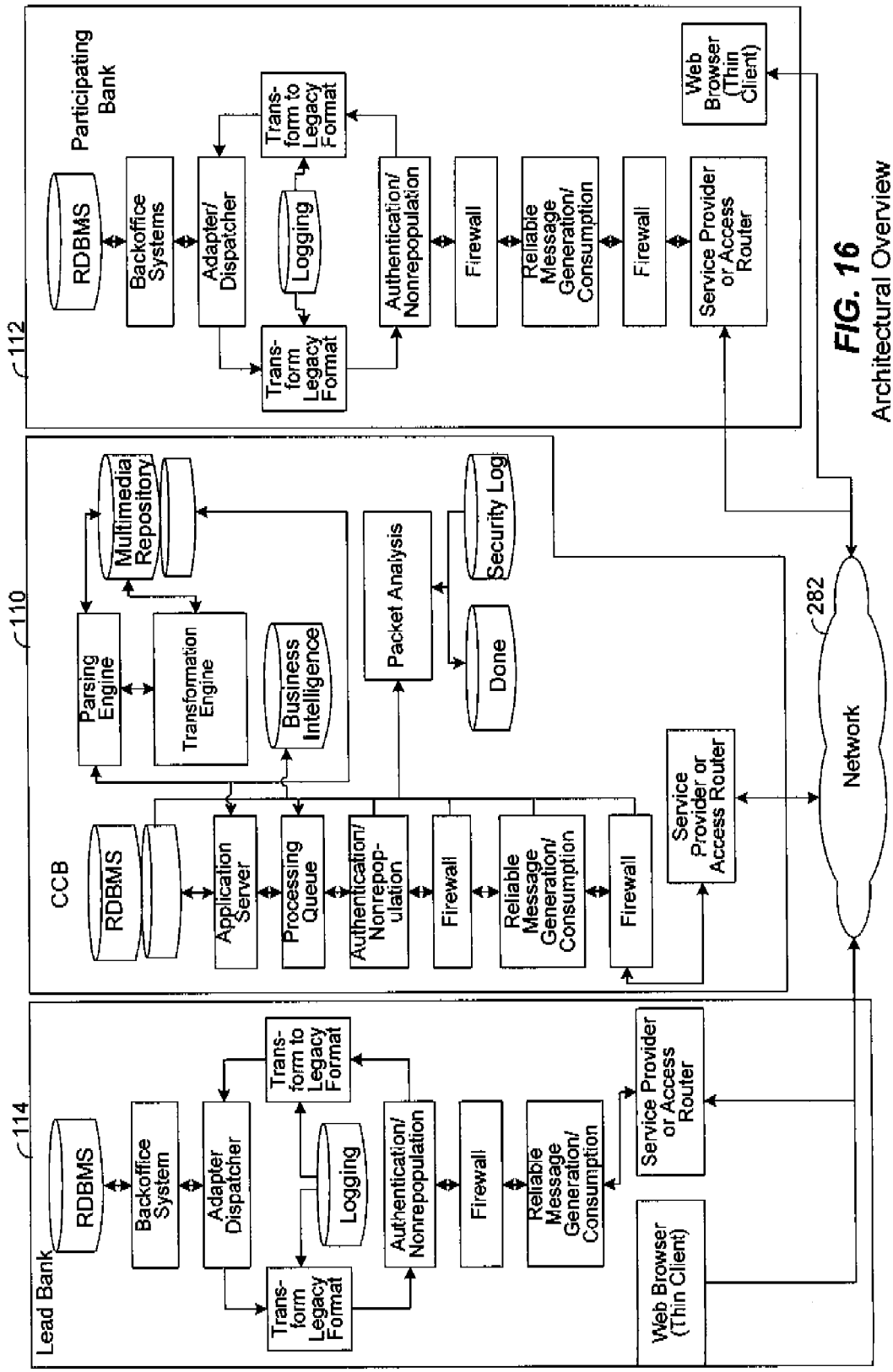
FIG. 16 is an architectural overview diagram for the system.

FIG. 16 is an architectural overview diagram for the system. This diagram represents ideas and building blocks of the system and provides an overview of the main concepts and relationships in the architecture. This architecture may include subsystems, components, nodes, connections, data stores, users and external systems. The architectural overview is simple by design, further detail is provided in the following figures. As previously mentioned, any of the functions within CCB may be out-sourced and performed by an outside vendor. One of skill will recognize those components and subsystems identified in FIG. 16.

Figure 17:
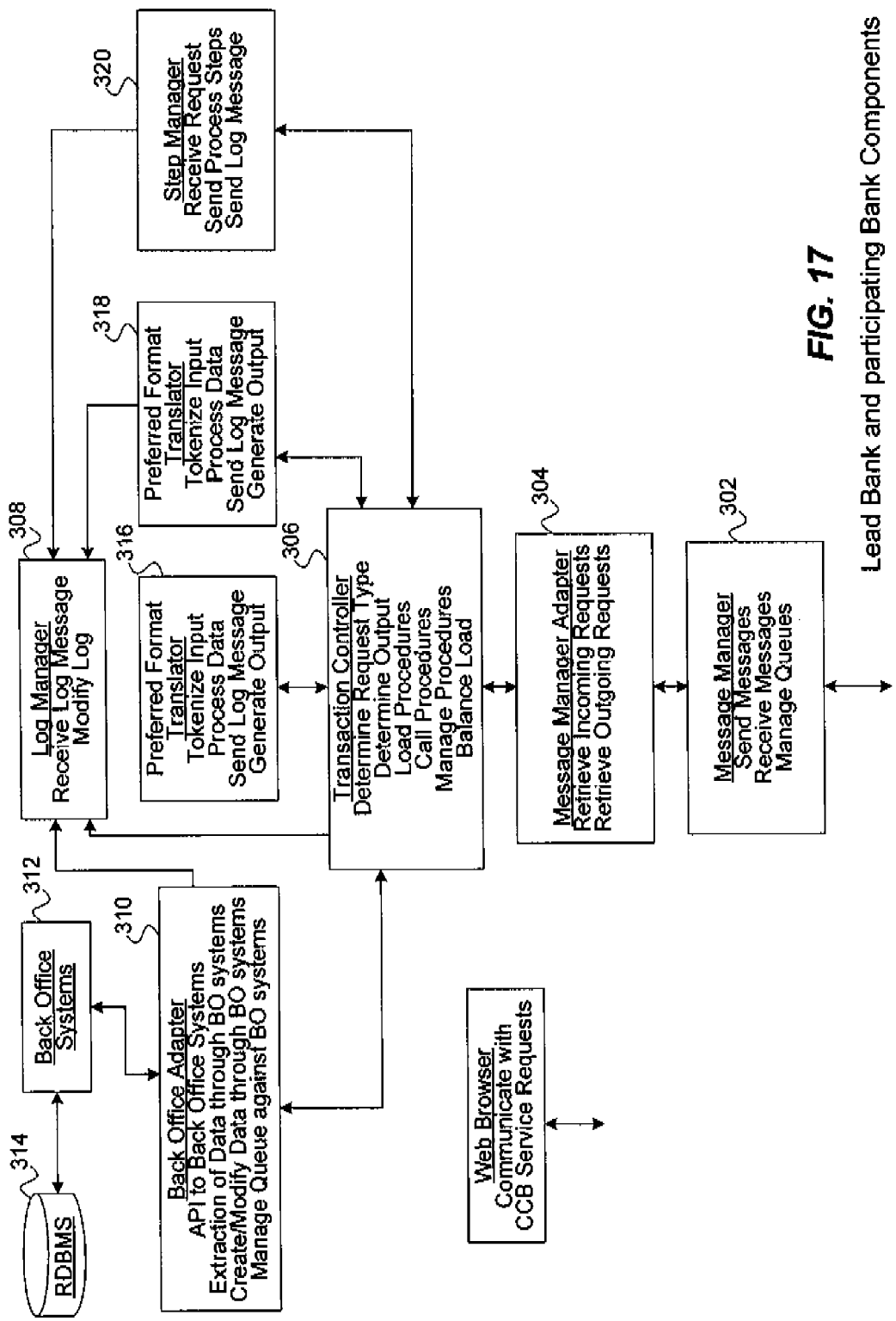
FIG. 17 illustrates major components possible within a lead or participating bank.
Figure 18:
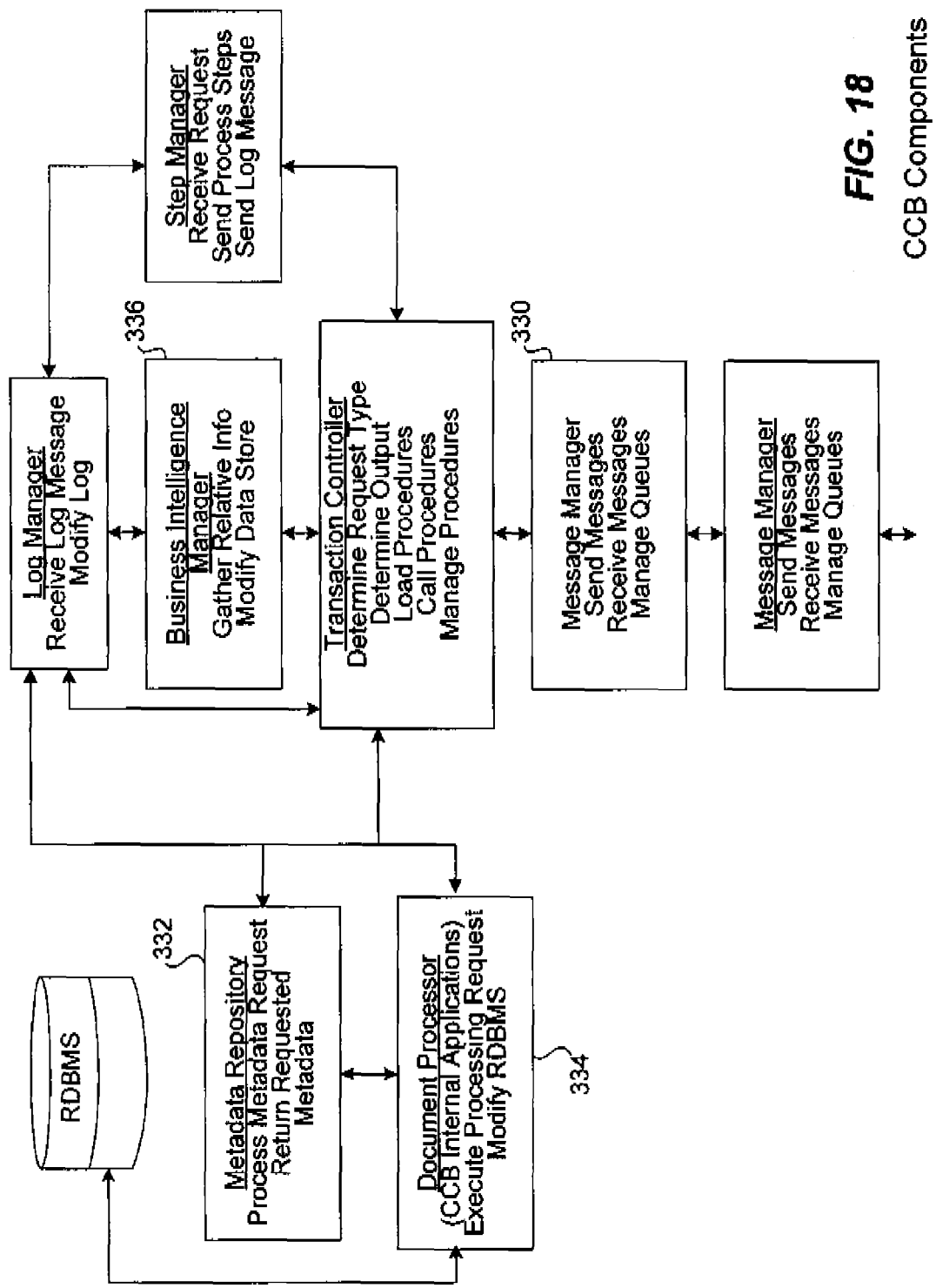
FIG. 18 illustrates major components possible within CCB.

FIGS. 17 and 18 represent a component model of the system. FIG. 17 illustrates major components within a lead or participating bank. FIG. 18 illustrates major components within CCB.

The component model describes a hierarchy of components and documents according to their responsibilities and service levels, their relationships, and the way they collaborate to deliver functionality. A component may be thought of as a relatively independent part of the system and is characterized by its responsibilities and by the interface it may offer. Components can be decomposed into smaller components or composed into larger components. Many components are software although some may be hardware.

FIG. 17 illustrates components of the system found in either the lead bank or a participating bank. The message manager component 302 is responsible for overall message management. This component is deployed at both the message transmission and receipt locations and uses a separate, known messaging queue at each location. The queue at each location will have identified to it the corresponding queue at the other location with which it needs to communicate. Each location also uses queue "listeners" to determine when a new message has been transmitted. This component supports a "publish and subscribe" model. Each queue may support a wide variety of communication protocols. Preferably, each queue supports either the TCP/IP or the SNA protocol as needed.

This component may be built in-house or purchased from a vendor. In one embodiment, this component uses the MQSeries product available from IBM, Inc. Users of this component are CCB, lead banks, participating banks or an issuer/processor, who determine the volume and frequency of data transmissions. Lead and participating banks may transmit or request data as their needs dictate, and the component preferably is capable of sending and receiving messages from multiple queues simultaneously. In this embodiment, CCB is designed as a batch-oriented environment. This implies that message queues will be processed in a FIFO manner; additional processing queues can be used to improve performance.

Although a wide variety of performance characteristics may be utilized by the present invention and achieve satisfactory results, it is most preferable if the message manager component provides guaranteed message delivery, regardless of the operational status of the transmitter or receiver. Furthermore, this component preferably provides availability around the clock, seven days a week. Although a wide variety of networks may be used to implement this component, it is preferable if the queues leverage an existing virtual private network (VPN) rather then the public Internet. As previously mentioned, it is contemplated that the VisaNet network will be used. If necessary, data may be encrypted by the network using any of a wide variety of algorithms.

The message manager adapter component 304 has the main task of communicating with the message manager through its native application programming interface (API). This component enables messages to be exchanged between the message manager and the transaction controller. It listens and receives messages from the inbound queues while placing outgoing messages into the outbound queues within the message manager component. In other words, this component is the API for the message manager.

Although this component may be implemented in different ways, it is preferable if the component is capable of receiving and routing a high volume of messages in a bi-directional flow. As with the message manager, the adapter is preferably designed to run around the clock, and preferably receives its input from message queues to insure that messages will not be lost. Assuming that this component resides within the internal firewall of any one participant, no additional security messages are needed.

The transaction controller component 306 is preferably a commercial application server that is a highly scalable product, capable of withstanding a high volume/high availability environment. In a preferred embodiment, object-oriented programming using the JAVA language is used to encourage developer productivity and to avoid reliance upon any single vendor's proprietary programming language. This component will be the central processing manager for requested transactions. At run time, the controller begins by determining the transaction type for the message it receives. Then the controller determines both the desired output format and the destination for the transaction. With this information it then retrieves a list of the required process steps necessary to complete the transaction, and finally executes the transaction.

This component contains a single sub-component, the transaction queue, which is designed to hold a message until it can be processed successfully. It may hold these messages in either a preprocessing or a post-processing state. Preferably, this component is capable of accepting, monitoring and running multiple transactions at any given instance; it is preferred that this component by available to run around the clock. Assuming that this component resides within the internal firewall, no specific security measures are required.

The log manager component 308 provides an audit trail as transactions are processed within the system. An organization employing this component will have the ability to generate reports using the audit trail data. Preferably the component does not generate reports itself; it is the responsibility of the organization to provide the tools to generate a report. This component accepts a stream of data from external components as they execute a particular step during transaction processing. The incoming data stream is stored in an internal queue and preferably is stored within a relational database for reporting purposes.

In one embodiment, the log manager component includes three sub-components: a log writer, a log queue and an underlying data store. The log writer consists of one or more processes that take a log message and update the data store using SQL statements. The log queue accepts incoming log messages and stores them until the data store has been successfully updated. The data store contains a serialized version of the data stream originally passed to the log queue. The data store consists of a relational database which enables the transaction audit data to be logged, indexed and accessed via SQL statements. Preferably, the data store also provides support for ODBC and/or JDBC, thus enabling other third party report tools to be used.

Preferably, this component is capable of receiving and processing data streams from multiple external components. The log queue is a dedicated logging process which minimizes I/O performance impacts on the other transaction processing components. As with other components, it is preferable that this component be available around the clock. It is also preferable that as transactions are processed, the log queue is able to accept incoming message streams.

The back office adapter component 310 is responsible for enabling the transfer of data to and from the proprietary data stores and transaction processing systems at the banks and their agent data processors. This component provides the ability to connect to a participant's back office system (existing systems that create and consume CCB messages) in a secure and reliable manner. In other words, this component is a form of "middleware" for connecting together disparate systems. Preferably, this component supports the following functionality: reliable, scalable programmatic access to back office systems; extraction of data from the back office system; and creation or modification of data within the back office system.

Preferably this component is capable of programmatically reading, creating and updating data (in the form of streams or serialized files) within a participant's back office system. Also preferably, this component is capable of programmatically extracting or inserting/updating large volumes of data in a reliable, scalable manner. As with other components, it is preferred that this component be available around the clock. If a participant is unable to provide around the clock availability for this component, each participant may cache the appropriate transactions that may impact their back office system.

Component 316 is a preferred format to CCB standard translator. This component encompasses any software and logic for the translation of data from a preferred format to an internal CCB data standard. The preferred format is the format of data used by the lead bank, participating bank or their respective data processing contractors.

This component initiates with input sent from a dispatching component. With this input, business logic can be applied to manipulate any necessary data fields. The output of the translator is a document in the internal CCB data standard. During the translation process, the component sends messages to a logging component to handle any status or error messages. A sub-component is a parsing engine that provides an API for either parsing or building a document that complies with the CCB internal data standard. As for other components, it is preferable that this component be available around the clock. Assuming that this translator resides within the internal firewall of a participant, there are no additional security measures needed. Essentially, this component provides an indirect mapping between a preferred data format and the internal CCB data standard.

Component 318 is a translator that encompasses any software and logic related to the translation of data from the CCB internal standard to a preferred format. This component essentially provides a reverse translation from the CCB format to the participant's format and may provide similar mapping and parsing functions to facilitate two-way communication between CCB and the participant. However, the functionality may or may not be exactly reciprocal if the messaging functions are not reciprocal, i.e., if different types of data or reports are sent in one direction than are sent in the other direction.

The component initiates with input sent from the messaging component. With this input, business logic is applied to manipulate any necessary data fields. The translator's output is a preferred data format compliant with a participants back office system. Throughout the process, the component sends messages to a logging component to handle any status or error messages related to a specific translation.

A subcomponent is a parsing engine that provides an API for either parsing or building a document that complies with the CCB internal data standard. As with other components, it is preferable that component 318 be available around the clock. Assuming that this translator resides within the internal firewall of a participant, there are no additional security requirements. It is recommended that schemas or other be used to validate data being sent or being received between a participant and CCB. This step insures that data being transferred within the system complies with the CCB data standard before being processed.

Step manager component 320 encompasses software and logic related to the retrieval of the processing steps for a transaction. The step manager receives a request for a list of steps necessary to successfully process a specific type of transaction. It receives these steps from the data store and returns them to the transaction controller component. This component is optional and may be replaced by static code if the participant's system processes a low number of transaction types. A subcomponent is a step data store which contains all necessary processing steps related to a specific transaction type. The performance requirements for this component are directly related to the number of transactions processed over a given time frame. If a participant receives a high volume of transactions, it is preferable that this manager be designed to handle such a high load. In one embodiment, this component may be implemented using a number of ANSI SQL statements. As with other components, it is preferable that the step manager be available around the clock. Assuming that the step manager resides within the internal firewall of a participant's system, there is no specific security requirement for this component. Back office systems 312 communicates with any suitable database such as RDBMS 314.

FIG. 18 illustrates components that appear within CCB. Some of these components have been previously described with reference to FIG. 17 and are also used in this figure.

The processing queue component 330 is somewhat similar to the message manager component with the difference being the scope of the defined queue. The queue established by the processing queue component is essentially a "traffic cop" designed to avoid flooding the application server with a large volume of requests. The processing queue provides a reliable, scalable cache of incoming service requests to be processed by the application server. Depending upon the application server used, the processing queue could be deployed as a separate component (instead of being internal to the application server).

Because of its function, it is preferable if this component be capable of storing or forwarding a large volume of system requests. The volume of these service requests will be directly related to the activities of the CCB participants. Additional processing queues can be established as volume scales upward, thus alleviating potential bottlenecks. Also preferably, this component provides guaranteed storage and forwarding of messages, regardless of the operation status of its users. The component is preferably available around the clock.

This component may be fully integrated with the application server or be deployed as a separate component. If an application server is selected that does not include an integrated queuing mechanism, a separate processing queue component is used. The implementation of a separate queuing mechanism could establish multiple queues that are serviced by an array of application servers.

The meta data repository component 332 is designed to manage the document type definitions (DTDS) used to build and validate messages in the internal CCB standard. For example, DTDS are used to build and validate XML messages, should that data standard be used. As mentioned before, CCB may use its own internal data standard which results in CCB messages and CCB documents. This component includes a schema management product that provides a central location for all CCB schemas. This product has the following functionality: it manages variances of the CCB standard across multiple participants; it allows access to schemas via a URL; it imports schemas; it logically groups schemas into categories, enabling the quick identification of schemas that are associated with development efforts or functional areas; it allows schema editing; it tracks relationships between schemas and schema elements; it verifies that schemas comply with corporate standards; it keeps track of versions of schemas over time; it allows a transformation from one version of the CCB standard to another; and it stores searches and displays such transformations, maps and functions. The meta data repository component is used by both translator components, CCB participants and the document processor component. As with other components, it is preferable that this component be available around the clock.

The document processor component 334 is designed to process a transaction and utilize internal CCB applications along with the CCB data store to complete processing. The document processor receives a request to process a transaction, executes required logic and also modifies the CCB data store. It generates both incoming and outgoing messages.

This component has two sub-components. A parsing engine assists with the parsing and creation of CCB standard messages. A persistence manager manages all modifications to the underlying data store on the CCB system. Preferably, it is the only component that makes calls to the CCB data store from within this system. Preferably, this component is available around the clock. Assuming the component resides within the internal firewall of CCB, there is no extra security requirement.

The business intelligence manager component 336 is designed to process a copy of an incoming transaction and to utilize a business intelligence (BI) data store to hold any BI data. This component is similar to the document processor; however, it deals with BI data rather then operational data. This component also contains a message queue to allow parallel processing within CCB. This component includes four subcomponents. A BI queue stores a message until the BI data store has been successfully updated. A BI agent handles the processing and modification to the underlying BI data store. This sub-component contains similar functionality to the document processor component. A BI interface sub-component provides a uniform interface for viewing and extracting data from the BI data store. The data store consists of a relational database which enables the BI data to be updated, indexed and accessed via ANSI SQL statements. Furthermore, the data store preferably supports ODBC and/or JBDC, thus enabling any number of third party report tools to be used. Preferably, this component is available around the clock. Assuming this component resides within the internal firewall of CCB, there is no specific security requirement for it.

FIG. 19 illustrates an overview of possible CCB software applications. This diagram depicts possible software applications and their functional areas which may be included within CCB. Because this figure is meant to convey general types of software application that may be used, the functional areas listed below may not correspond one-to-one with the high-level business functions depicted in FIGS. 1 and 2. The applications of FIG. 19 are intended to interact with one another to satisfy the business requirements of CCB. For a more detailed explanation of the internal business processes that these applications support, refer to the Business Function Processes section above.

Detailed Physical Architecture

FIG. 20 illustrates one embodiment of a physical architecture for the lead and participating banks, and for CCB. The embodiment of FIG. 20 represents one possible hardware implementation of the system, many other hardware embodiments are also possible. FIG. 20 provides some detail regarding implementation, however, it is not intended to be a detailed specification for implementation. The nodes shown and described represent a preferred deployment configuration for the global commercial card processing system, and details of the implementation may change as the need of the system changes.

Shown are possible hardware implementations for a lead 114 or participating 112 bank and CCB 110, both being connected via network 282. Preferably, the network uses an IP Backbone provided by VisaNet. An access router 402 of CCB determines the next network point to which a packet should be forwarded. This component routes traffic out over the IP Backbone and provides the capability to prioritize traffic via quality of service utilities and encapsulates SNA packets in IP wrappers on an as needed basis. Limited security via ACL is supported. Preferably, a packet analyzer (sniffer) is deployed at the router level to help monitor performance and guard against unauthorized access.

Firewall 404 is an application that protects the resources of the internal trusted network from other entities on network 282. Preferably, the firewall is installed on a dedicated server that is maintained and deployed separately from other CCB components, thus preventing unauthorized requests to directly access internal resources. Packets analysis unit 406 is used to gather data for reporting on system performance levels and for analyzing packets for advance detection of unauthorized system activities. The packet analyzer can be hardware or software based. If software based, it is preferable that the analyzer be loaded onto a server that process large volumes of traffic. A hardware based packet analyzer is preferred as it provides a more secure and scalable approach since it does not rely upon the resources of another device.

Load balancer 408 is a dedicated hardware or software based service used to access a server "farm." For example, servers that process high volumes may be deployed as a server farm in which redundant servers host the same services. Preferably, servers within the internal CCB network will use IP based communications, meaning that each server will have a dedicated IP address. Load balancer 408 receives a request for a given server and reroutes it to a given server within the farm. The load balancer selects a server based on its current processing levels and servers with a lower level of processes will be selected first. Two approaches may be used for load balancing: round robin DNS and single IP images. With round robin, each server's IP address is logged with the load balancing service. The load balancing service then chooses an IP address from the available pool and assigns it to the associated process request. For single IP images, a single IP image is used in more intelligent techniques for distributing the work load. Rather than logging each server's IP address with the load balancing service, a single IP image is assigned for the entire server farm—requests for server processing are directed to the load balancing service that translates the IP image into a true IP address. The request is then assigned to a server within the farm. This approach differentiates itself from the round robin technique in that a separate service is used to monitor the status of servers within the farm. This monitoring service prevents the load balancer from assigning the request to a server that is unavailable.

Management console 410 is preferably a single processor that hosts CNMP/network monitoring tools. Due to the abundance of networking utilities bundled into their underlying operating systems, most network management products will use some flavor of UNIX, although other operating systems are possible. Because of the volume of traffic moving through the CCB internal network, it is preferred that the monitoring applications are capable of measuring overall system throughput and tying it back to service level agreements. Management console 410 monitors overall system performance and also detects suspicious system activity. One example of a console that may be used is OPEN VIEW available from Hewlett Packard.

Step repository 412 is preferably a multiprocessor UNIX server hosting a relational database, although other hardware is possible. The data within the relational database describes the steps necessary to successfully process a given CCB transaction. Depending on the design of the database, the actual data returned by a query may be names and execution order of a series of methods that the calling process will execute, or a serialized JAVA object that can be parsed and instantiated by the calling process. The calling process would then invoke methods within the instantiated JAVA object to process the CCB transaction. The lateral approach is preferable as it is flexible and powerful.

Queue manager 414 is preferably a single processor UNIX server used to define and post the processing queues. The Queue manager is responsible for overall message management between the banks and CCB. Message queuing APIs are deployed at both message transmission and receipt locations and use separate, named processing queues for each bank.

Database servers 416 are a small farm of servers that provide the data storage and retrieval for CCB. Preferably, these are multiprocessor UNIX servers. Preferably, the servers support high speed disk striping and support distributed queries/updates in a relatively seamless manner. Also preferably, the servers support RAID level 5 and "hot-pluggable" SCSI-2 drives. A database engine associated with the server farm preferably includes the following functionality: support for JDBC or other open database connectivity option; support for connection polling; distributed COMMITs across multiple servers; real-time replication services; row level locking; session and state management; and object relational storage capabilities. Business intelligence server 418 is a flexible, highly scalable server capable of supporting complex queries and dynamic data aggregation provided by data warehousing utilities. Preferable, this server is also a multiprocessor UNIX machine. Server 418 is not responsible for storing data, data used by the server resides upon a dedicated storage device. Server 418 is dedicated to hosting the extracting, transformation and data manipulation processes required to generate complex business intelligence reports for CCB members.

Business intelligence data store 420 is preferably a network disk array (a storage area network) capable of hosting the large volumes of data to be processed by server 418. Data store 420 also preferably supports high speed disk striping and distributed queries/updates. It is also preferable that support for RAID level 5 and hot pluggable SCSI-2 drives is supported. It is preferable that the data store not be integrated with the database servers to avoid potential performance bottlenecks. Meta data repository 422 uses a single processor UNIX server.

Step manager 424 is preferably a multiprocessor UNIX server capable of responding to large volumes of request from application servers 426. The step manager retrieves the appropriate steps for processing a given CCB transaction. The step manager contains a HTTP daemon which provides the transport mechanism for internal processes to post requests to the step manager. The step manager receives and services the request via one or more JAVA servlets. A service request causes the step manager to retrieve relevant data from the step repository. The step manager is conceptually similar to a work flow engine—it retrieves the instructions for processing a given CCB transaction. The step manager is optional and may be replaced by static code, depending upon the volume of bank requests.

Application server farm 426 includes a number of application servers that provide central processing management for the transactions flowing through the system. This farm includes two or more identically configured machines to provide scalability and continuity. Preferably, each server is a multiprocessor UNIX machine running a mature application server product (for example, BEA web logic). It is preferred that support for Enterprise JAVA Beans (EJB) is available.

In addition to an EJB server, each application server implements an API for retrieving requests and posting responses to the transaction queues. Because each bank utilizes a dedicated queue, a bank management process is implemented on an application server. The bank management process is used to associate banks with a given queue. In addition, the bank management process is capable of storing a given bank's processing requirements.

A wide variety of additional safeguards are preferably used to protect the internal CCB system. These additional safeguards include: isolating the web server; disabling unneeded services on the server; using different virus scanners; installing an intrusion detection system; and other security measures known to those of skill in the art.

Additionally, normal maintenance and upgrade requirements for software, hardware and network components necessitate that the capability exists to migrate components off line for extended periods of time. Preferably then, fully redundant, potentially geographically isolated facilities are used to allow a single web server, web application server, UNIX server or sub network to be shut down as required. Those of skill in the art will recognize that features such as fail over, data replication, disaster recovery and others may be implemented as required to provide for a robust system.

Any suitable internal network 428 such as a 100 MB Ethernet may be used to provide communication between the components of the Internal CCB system. Similarly, a lead or participating bank 112, 114 will have components such as an access router 452, a firewall 454 and a network 466 for communicating with the network 282. In addition, a bank may include a client 456, a bridge 458 and a token ring 460. A front end processor 462 and card processing system 464 may also be used.

Data Exchange Requirements

The following section provides one possible embodiment defining the data to be exchanged between lead banks and participating banks as part of implementing a multi-national card program. The data exchange subject areas and specific data described below are used to support delivery of a particular process within a multi-national card program. In other words, this section illustrates the data exchange needs between lead banks and participating banks.

A variety of means for data capture, consolidation and communications are possible with the present invention. The following describes one possible embodiment for organization and communication of data. In general, CCB focuses primarily on transactional and cardholder data, although it can accommodate enriching these data with non-financial data. During implementation of a card program, participating banks will transmit transactional and cardholder data to CCB for all lead bank's clients. These data are consolidated and sorted by lead bank and by client and are preferably stored in a data store of CCB. The stored data is forwarded or made available to an appropriate lead bank. The file format and file transfer preferably uses the CCB internal data standard.

Regarding enhanced data, it may originate from any third party data provider with the objective of supplementing transactional data. For example, this enhanced data may come from a provider such as the Commuter Reservation Systems (CRS), from Dun & Bradstreet, UN Standard Purchasing Commodity Codes, etc.

The consolidated data obtained from CCB may be processed by a lead bank to provide their clients with customized and proprietary MIS reports. CCB may also aggregate consolidated transactional and cardholder data for internal MIS reports that will be used by CCB management and by a lead bank global relationship manager. The internal MIS reports preferably include all information necessary to better manage the multi-national programs and to better service clients. Preferably these reports are made available on-line, although access is preferably restricted to lead banks and only for their respective clients. A lead bank may elect to give their clients access to their respective internal MIS reports. Reports for CCB management may include country environment information such as cost of funds, foreign exchange rates and local interchange rates.

Figure 21:
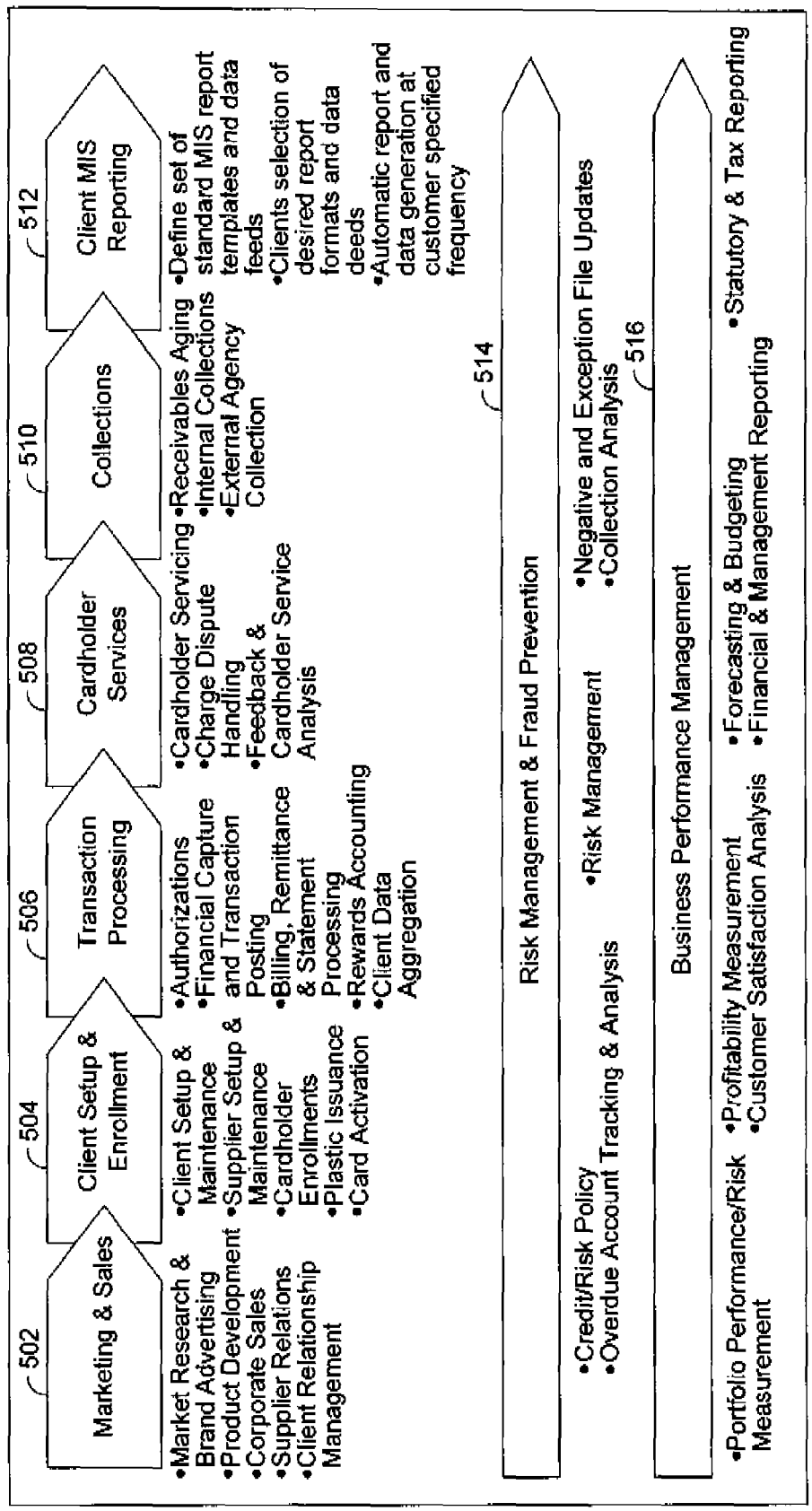
FIG. 21 illustrates a business process model for a multi-national commercial card program.

FIG. 21 illustrates a business process model for a multi-national commercial card program according to another embodiment. This is one example of a possible business model, and is presented here to illustrate the data exchange needs between entities. The model illustrates high-level business processes 502-516 that describes what activities are performed to support a multi-national program. Each business process is further decomposed below into the various sub processes that define that process. Review of these high-level business processes and their subprocesses is useful for analyzing the data exchange of the system.

For each activity within a business process, either the lead bank or a participating bank will have primary responsibility for performance of that activity. Although the lead bank and participating banks agreements (and other information provided herein) define which entity has primary responsibility, one of skill in the art will realize that responsibility may be shared, or that a responsibility may be delegated to another entity within the spirit of the present invention.

FIGS. 22A-22E list data requirements of a participating bank. FIGS. 23A-23D list data requirements of a lead bank. The data requirements are organized by activities of the business processes of FIG. 21. It should be appreciated that these data requirements may vary depending upon which entity is responsible for a particular data item. Function 602 refers to one of the processes 502-516 of FIG. 21. Primary Process Responsibilities 604a, 604b list the responsibilities of the participating and lead banks. Activities 606 provide detail, and data 608, 610 show the flow of data.

Figure 24:
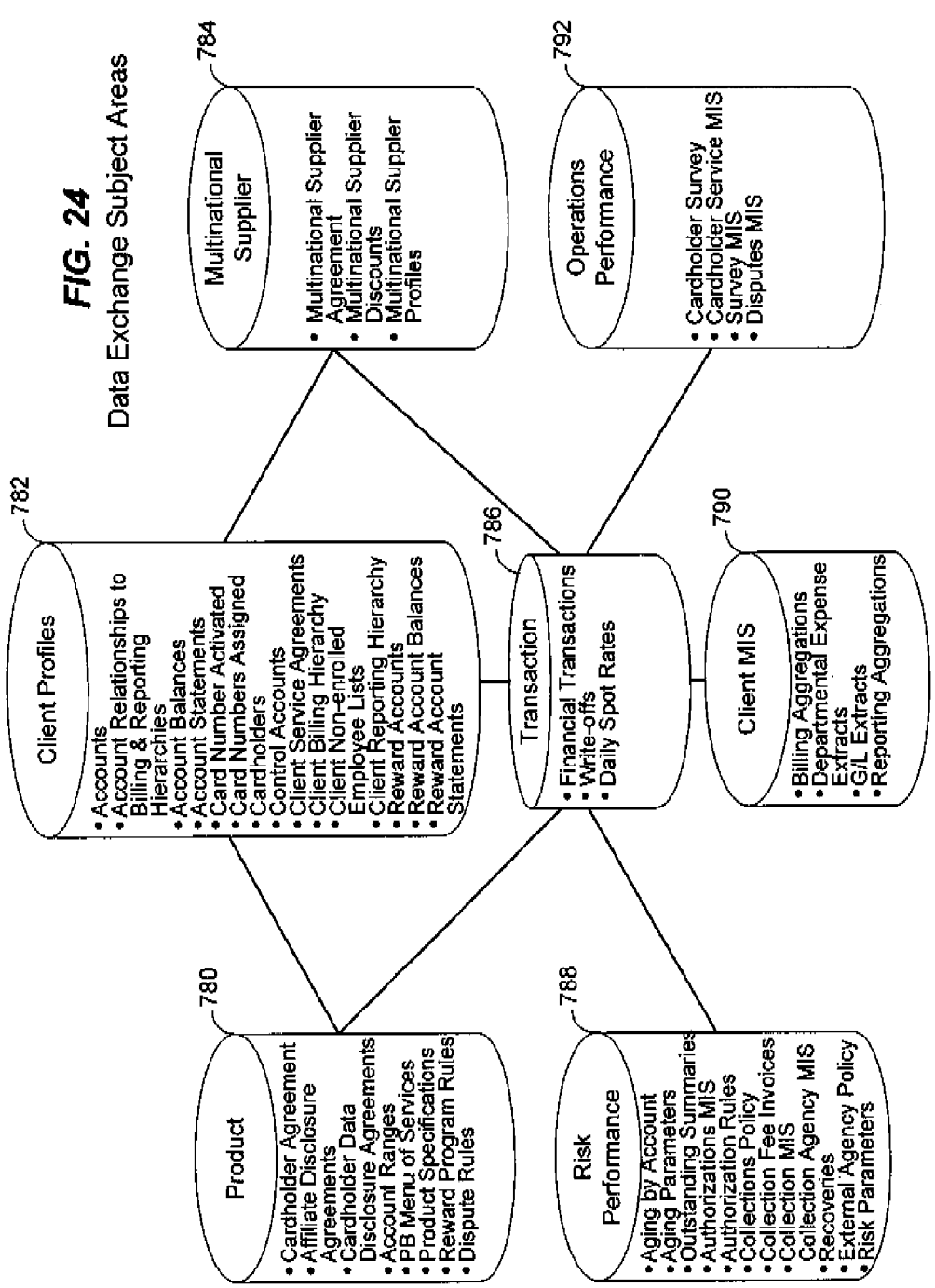
FIG. 24 illustrates one embodiment of data exchange subject areas for the present invention.

FIG. 24 illustrates one embodiment of data exchange subject areas for the present invention. The previous FIGS. 21, 22 and 23 have illustrated various business processes and the various data to be exchanged between entities. One way to view this data is via a grouping such as is shown in FIG. 24.

These data areas include product 780, client profiles 782, multi-national supplier 784, transaction 786, risk performance 788, client MIS 790 and operations performance 792. The product grouping of data items relates to those items associated with a corporate or purchasing card program, and the servicing and implementation of such programs. The client profiles grouping 782 includes data item data items associated with how to manage a client account including specific information about the client program, and data to assist with managing and servicing the client account. Multi-national supplier grouping 784 includes vendor data related to products and services that a merchant might sell to a client. CCB is able to capture such data from transaction data.

Transaction grouping 786 includes data typically associated with bill statement information. Risk performance grouping 788 includes data for global credit underwriting. For a bank that is not underwriting a client outside of its jurisdiction, there may be no need for this data. If a bank is underwriting such a client though, such information is used by risk managers of the bank. Client MIS grouping 790 includes data items that are typically reported back to the client for use in its management information systems. Operations performance grouping 792 includes data items related to performance measurements listed in the menu of services. In general, this grouping includes data about how well a bank and CCB are servicing a client.

For each data item included in a grouping, there are performance factors that help define a particular service level. Any of a wide variety of service levels are possible depending upon the implementation of the system, the desires of the parties, and the resources available. Performance factors related to these data items may include: priority, the relative priority of a data exchange packet; data type, codified data, graphical or unstructured text; primary keys, the identifiers of a data packet that point to one unique occurrence; data currency, how up-to-date the data must be when it is exchanged; frequency, how frequently the data packet will be exchanged; size of the data packet; average packet size; cycle time; triggers for transmitting a data packet; receipt confirmation; exception handling; and the particular data standard used. One of skill in the art will appreciate that the values of these performance factors may take on a wide range depending upon a specific implementation.

Network and Computer System Embodiment

Implementation of a network for communication between CCB and banks, in addition to choice of a protocol may be handled in many different ways. For example, the telecommunications network known as VisaNet has historically provided the network services and network infrastructure to process Visa transactions in a rapid and reliable manner. VisaNet provides a link between Visa's internal SNA network and external customer networks. In general, VisaNet provides the messaging infrastructure for Visa's global transaction processing systems. Although VisaNet may be used for implementing CCB' message delivery infrastructure, it would be preferable if VisaNet were eventually replaced by an IP-based network.

For example, a wide area network (WAN) may be used to augment and eventually replace the current SNA network. Such an implementation may include an IP backbone with nodes worldwide; these nodes may be assessed through a frame relay network with a router at the point of access (e.g., a bank, a processor, etc.) Regarding application systems, the INFOSPAN proprietary application system may be used in certain areas. For example, it is preferable to use the InfoSpan messaging format for interoperable ability, and the InfoSpan database format for implementation of a Commercial Card Data Repository (CCDR). Other applications, systems and networks are preferable for use if they are available worldwide, are or may become an industry standard, and are easy to maintain. For example, application such as "File Broker" and "Direct Exchange Network" may not be suitable for use with the system as they are primarily for use only within the United States.

Figure 25A:
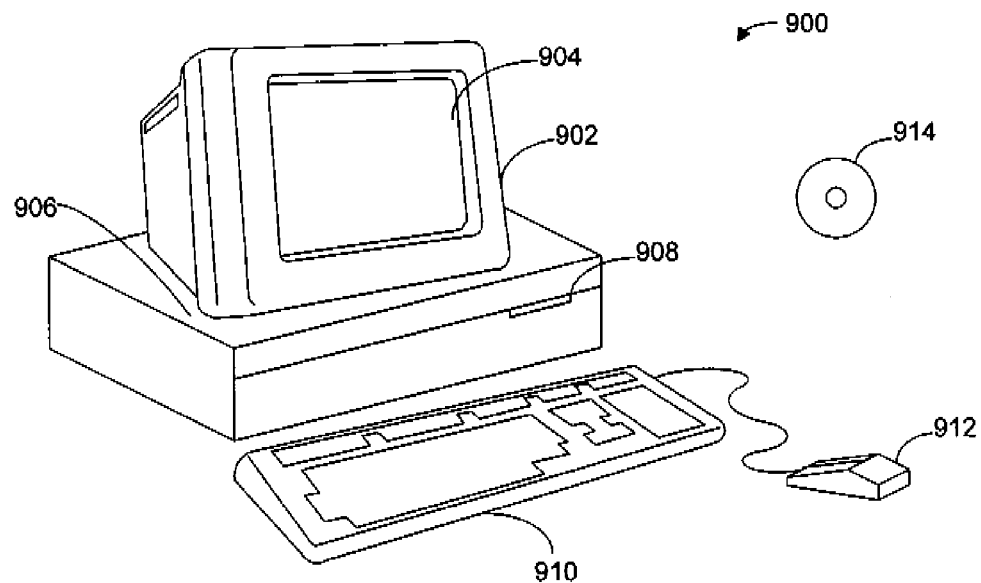
FIGS. 25A and 25B illustrate a computer system 900 suitable for implementing embodiments of the present invention.
Figure 25B:
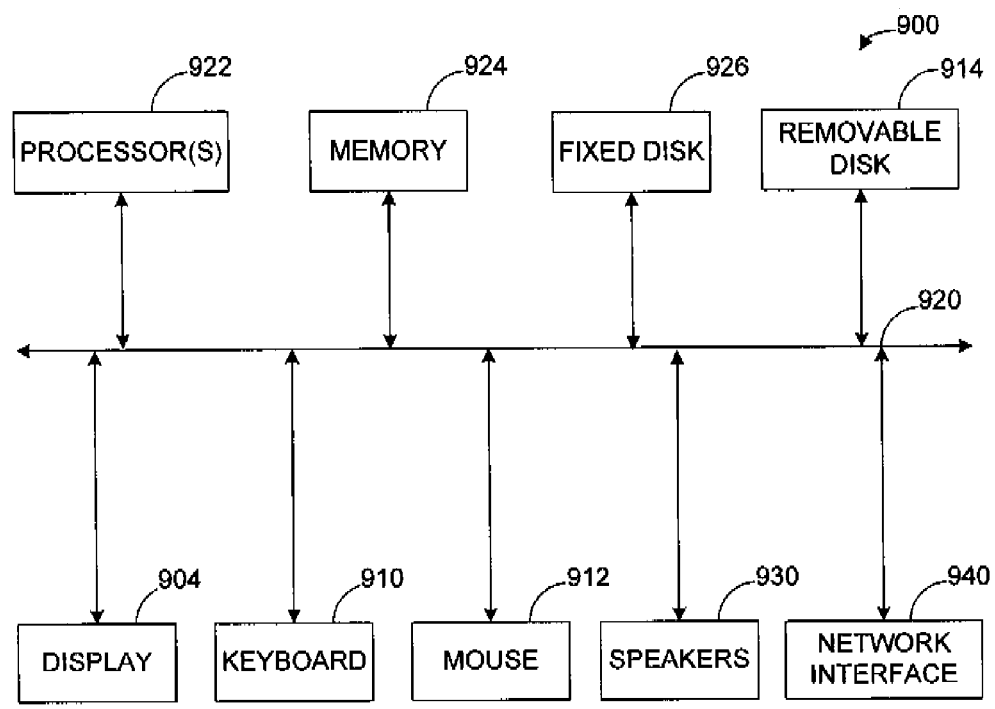

FIGS. 25A and 25B illustrate a computer system 900 suitable for implementing a computer in various embodiments of the present invention. FIG. 25A shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 25B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of arranging a program for a client by a central coordinating body (CCB), said method comprising:

publishing, via a network, a list of services available for use in said program;

entering into a first agreement, by the CCB, with a lead issuer, said first agreement obligating said CCB to make available said services to said lead issuer for use in said program;

entering into a second agreement, by the CCB, with a local issuer, said second agreement obligating said local issuer to make available said services for use in said program, at pricing established independently by said local issuer;

reviewing a bid document, using a computer, from said lead issuer that includes at least one service to be offered to said client for use in said program, wherein said first agreement between said lead issuer and said CCB includes a definition of a bid process that said lead issuer and said CCB agree to follow, the lead issuer bidding on services offered by the local issuer; and based on the review of the bid document, confirming, by the computer, to said lead issuer that said one service will be made available by said local issuer, wherein said local issuer provides said one service to said client in a local area, said method further comprising:

facilitating, by the computer, a transfer of revenues from said program in said local area to said lead issuer;

determining, by the computer, a fee for the provision of said one service to said client in said local area; and facilitating, by the computer, a transfer of the fee from said lead issuer to said local issuer, wherein said local issuer provides said one service to said client in said local area on behalf of said lead issuer, and wherein said lead issuer does not have the capability to provide said one service to said client in said local area, based on the first agreement between the lead issuer and the CCB.

2. The method as recited in claim 1 wherein said program is a corporate card program, a purchasing card program or a distribution card program.

3. The method as in claim 1 further comprising publishing services available in various jurisdictions.

4. The method as in claim 1 further comprising publishing levels of services applicable to the services.

5. The method as in claim 1 wherein the client is a multinational client.

6. The method of claim 1 further comprising receiving the bid document.

7. The method of claim 6 further comprising comparing the bid document against the menu of services.

8. The method of claim 7 wherein comparing is performed by the computer.

9. The method of claim 8 further comprising receiving an RFP (request for proposal) from the client.

10. The method of claim 1 wherein the list of services includes service levels applicable to the services, any deviations from standard services in different jurisdictions for different local issuers, and any time periods for which the services are committed by the different local issuers.

11. The method of claim 1 wherein the local area is a country that is different than a country in which the lead issuer operates.

12. The method of claim 1 wherein the computer comprises a document processor component that is adapted to process a transaction and utilize internal CCB applications along with a CCB data store to complete processing.

13. The method of claim 12 wherein the document processor component comprises a parsing engine, and a persistence manager that manages all modifications to the CCB data store.

* * * * *